US011218472B2

(12) United States Patent
Rosenblatt

(10) Patent No.: US 11,218,472 B2
(45) Date of Patent: Jan. 4, 2022

(54) METHODS AND SYSTEMS TO FACILITATE ESTABLISHING A CONNECTION BETWEEN AN ACCESS-SEEKING DEVICE AND AN ACCESS GRANTING DEVICE

(71) Applicant: Steve Rosenblatt, Middletown, NY (US)

(72) Inventor: Steve Rosenblatt, Middletown, NY (US)

( * ) Notice: Subject to any disclaimer, the term of this patent is extended or adjusted under 35 U.S.C. 154(b) by 0 days.

(21) Appl. No.: 16/918,833

(22) Filed: Jul. 1, 2020

(65) Prior Publication Data

US 2021/0006552 A1  Jan. 7, 2021

Related U.S. Application Data

(60) Provisional application No. 62/869,203, filed on Jul. 1, 2019.

(51) Int. Cl.
*G06N 10/00* (2019.01)
*H04L 29/06* (2006.01)

(52) U.S. Cl.
CPC .......... *H04L 63/083* (2013.01); *G06N 10/00* (2019.01); *H04L 63/102* (2013.01)

(58) Field of Classification Search
CPC ...... H04L 63/083; H04L 63/102; G06N 10/00
See application file for complete search history.

(56) References Cited

U.S. PATENT DOCUMENTS 8,745,394 B1   6/2014 Rahat et al.
10,439,806 B2* 10/2019 Fu ............................. H04L 9/14
2005/0071677 A1*  3/2005 Khanna .................... H04L 67/34
                                                      726/4
2008/0114983 A1*  5/2008 Sherkin ................. H04L 63/083
                                                    713/171
2009/0260065 A1* 10/2009 Kailash ................. G06F 21/316
                                                      726/5
2013/0007456 A1*  1/2013 Dean ..................... H04L 63/168
                                                    713/171
2014/0237565 A1*  8/2014 Fleysher ............... H04L 63/083
                                                      726/6

(Continued)

FOREIGN PATENT DOCUMENTS

GB        2488753 A      9/2012
WO    WO2011103561 A3    1/2012
WO    WO2017185999 A1   11/2017

*Primary Examiner* — Yonas A Bayou

(57) ABSTRACT

Disclosed herein is a method to facilitate establishing a connection between an access-seeking device and an access granting device. The method may include receiving, using a communication device, a Quantum Level Security (QLS) code from the access-seeking device. Further, the QLS code may be generated by the access-seeking device based on at least one QLS function and at least one parameter. Further, the method may include receiving, using the communication device, an independent QLS code generated by an access granting device based on the at least one QLS function and the at least one parameter. Further, the method may include comparing, using a processing device, the QLS code and the independent QLS code. Further, the method may include establishing, using the communication device, the connection between the access-seeking device and the access granting device based on a result of the comparing.

18 Claims, 24 Drawing Sheets

(56) References Cited

U.S. PATENT DOCUMENTS

| | | | | |
|---|---|---|---|---|
| 2014/0259138 A1* | 9/2014 | Fu | ............................ | G06F 21/32 |
| | | | | 726/7 |
| 2015/0222619 A1* | 8/2015 | Hughes | ................. | H04L 9/0852 |
| | | | | 713/168 |
| 2016/0359839 A1* | 12/2016 | Natividad | .............. | H04W 12/06 |
| 2017/0054556 A1* | 2/2017 | Fu | ......................... | H04L 9/3226 |
| 2017/0126654 A1* | 5/2017 | Fu | ......................... | H04L 63/083 |
| 2017/0214525 A1* | 7/2017 | Zhao | ................... | H04W 12/041 |
| 2017/0302448 A1* | 10/2017 | Luk | ....................... | H04L 9/0643 |

* cited by examiner

METHODS AND SYSTEMS TO FACILITATE ESTABLISHING A CONNECTION BETWEEN AN ACCESS-SEEKING DEVICE AND AN ACCESS GRANTING DEVICE

The current application claims a priority to the U.S. Provisional Patent application Ser. No. 62/869,203 filed on Jul. 1, 2019.

FIELD OF THE INVENTION

Generally, the present disclosure relates to the field of data processing. More specifically, the present disclosure relates to methods and systems to facilitate establishing a connection between an access-seeking device and an access granting device. These methods and systems, enable encryption without the negotiation and/or transmission of one or more encryption keys.

BACKGROUND OF THE INVENTION

Conventional communication between a browser and a server, in an instance, may be based on TLS handshake protocols (TLS is Microsoft's implementation of SSL which is the basis of HTTPS that a user may see at the top of the browser all the time). Further, the conventional communication (with the TLS handshake protocol) encrypts data transmitted between the browser and server but does nothing to limit access to the server. That is left to each application's login process and has been a major cause of a number of malicious breaches.

Further, the convention communication, in an instance, uses two encryption keys ("public" and "private") to establish a single encryption key that is then used for an entire session. Thus sending multiple transactions using the same key. Consequently, any unauthorized access to the key (such as by malicious hackers), in an instance, may lead to information leak from other transactions and/or transmissions.

Therefore, there is a need for improved methods and systems to facilitate establishing a connection between an access-seeking device and an access granting device that may overcome one or more of the above-mentioned problems and/or limitations, and for limiting the threat of interception and hacking. This is especially true given the ongoing development of quantum computers that can discern patterns of encryption thus compromising transmissions.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method to facilitate establishing a connection between an access-seeking device and an access granting device.

The method may include receiving, using a communication device, a Quantum Level Security (QLS) code from the access-seeking device. Further, the QLS code may be generated by the access-seeking device based on at least one QLS function and at least one parameter. Further, the method may include receiving, using the communication device, an independent QLS code generated by an access granting device based on the at least one QLS function and the at least one parameter. Further, the method may include comparing, using a processing device, the QLS code and the independent QLS code. Further, the method may include establishing, using the communication device, the connection between the access-seeking device and the access granting device based on a result of the comparing.

According to some embodiments, a system to facilitate establishing a connection between an access-seeking device and an access granting device is disclosed. The system may include a communication device configured for receiving a Quantum Level Security (QLS) code from the access-seeking device, wherein the QLS code is generated by the access-seeking device based on at least one QLS function and at least one parameter. Further, the communication device may be configured for receiving an independent QLS code generated by the access granting device based on the at least one QLS function and the at least one parameter. Further, the communication device may be configured for establishing the connection between the access-seeking device and the access granting device based on a result of comparing. Further, the system may include a processing device configured for comparing the QLS code and the independent QLS code.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
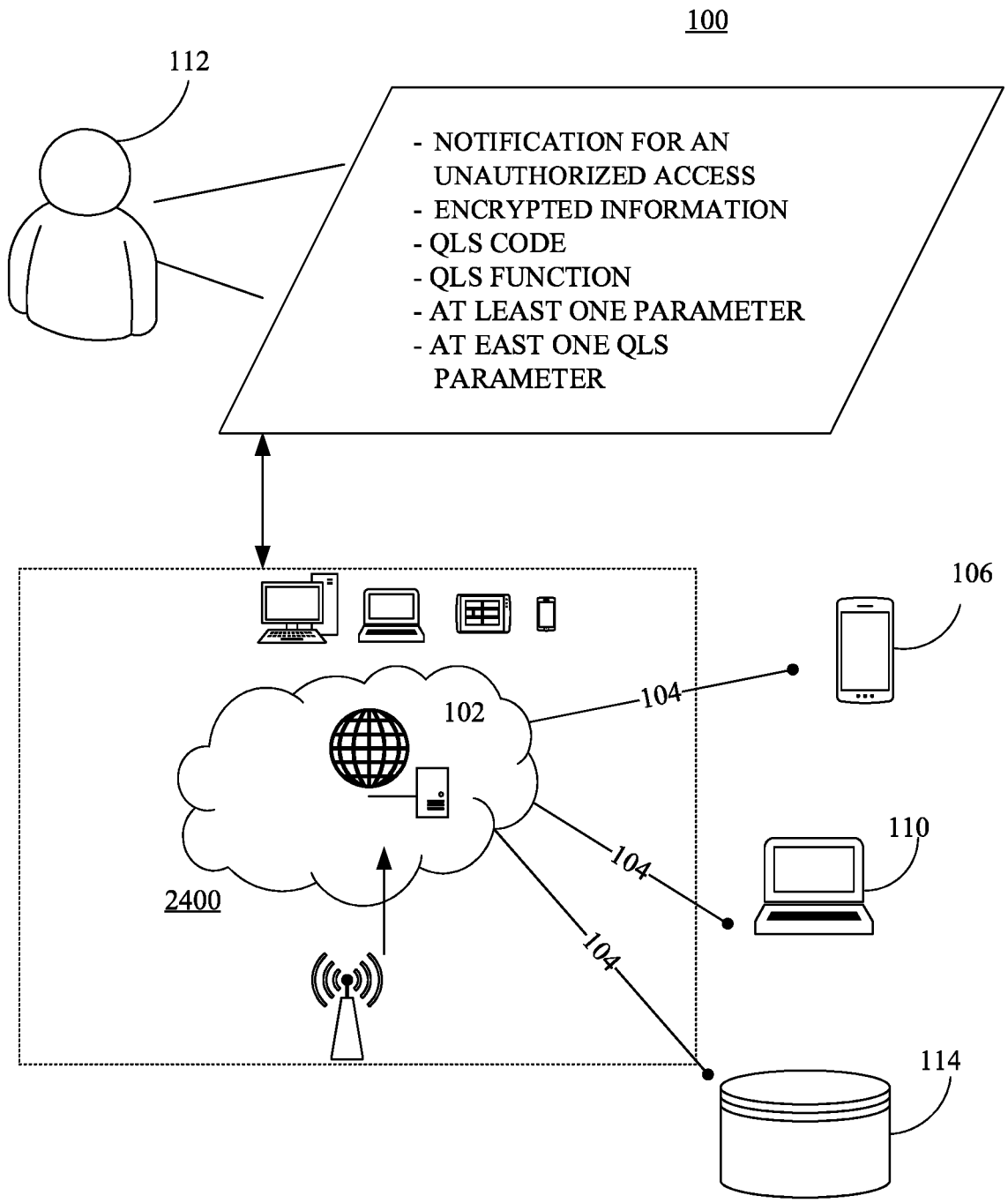
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems to facilitate establishing a connection between an access-seeking device and an access granting device, embodiments of the present disclosure are not limited to use only in this context. Accordingly, the embodiments disclosed herein have broad applications beyond device access.

Overview:

The present disclosure relates to systems and methods to facilitate communication between one or more devices based on quantum level security.

According to some embodiments, a method to facilitate establishing a connection between an access-seeking device and an access granting device is disclosed. Accordingly, the method may include a step of receiving, using a communication device, a Quantum Level Security (QLS) code generated by an access-seeking device. The term "QLS" is a working name and may be subject to change based largely on trademark and copyright considerations. Further, the method may include a step of receiving, using the communication device, an independent QLS code generated by an access granting device. Further, the method may include a step of comparing, using a processing device, the QLS code and the independent QLS code. Further, the method may include a step of establishing, using the processing device, a connection between the access-seeking device and the access granting device based on the comparing.

According to some aspects, a method to facilitate data transfer security between a sending device and a receiving device based on quantum level security is disclosed. Accordingly, the method may include a step of receiving, using a communication device, an encrypted information encrypted with a QLS key generated by a sending device. Further, the method may include a step of receiving, using the communication device, an independent QLS key generated by a receiving device. Further, the method may include a step of decrypting, using a processing device, the encrypted information based on the independent QLS key. Further, the method may include a step of transmitting, using the communication device, the encrypted information to the receiving device based on the decrypting.

The present disclosure describes "QLS". Further, the "QLS" prevents access by unauthorized computers or devices. Further, "QLS" may also provide safer and faster data transmission. Further, the present disclosure may make malicious activity such as "man in the middle" becomes impractical. Further, "QLS" works even if accurate, current logon information from hacking, phishing, or the dark web is used, and even if MAC address, IP address, and computer name have been compromised and emulated. Further, the "QLS" requires no additional user actions nor extensive use of computer resources. Further, the present disclosure may prevent the Russian from hacking into the Democratic National Committee. Further, the present disclosure prevents the computers of the bank from being hacked. Further, the present disclosure may protect internet accounts when the credit agency gets hacked. Further, the present disclosure may prevent identity thieves from stealing the data associated with the credit reporting agencies.

Further, the present disclosure may describe each of two or more authorized computers/devices establishing a relationship. Further, the each of the two or more authorized computers/devices may use special QLS functions and parameters to independently generate identical QLS encryption keys. Further, QLS encryption keys are not transmitted over the internet or networks. QLS encryption keys are not saved on any computer or device. Further, the information may not be intercepted or obtained by malicious access to a QLS secure device. Further, the each of the two or more authorized computers/devices may be the QLS secure device. Further, QLS encryption keys change each time they are generated. Thus, even decryption of one partial information packet cannot be used to decode other packets of information. Also, packets of data cannot be combined to provide a larger sample for decryption algorithms QLS functions and parameters (the means by which QLS keys are generated) also changes. Thus limiting the practicality of discerning a pattern by keeping a history of prior encryption keys. Multiple parameters are required by each function. QLS coding, functions, and parameters and data are saved in encrypted form. QLS parameters can consist of both internally generated information, and independent third party data. QLS functions modify the QLS parameters. Further, the QLS parameter may modify the QLS parameters by adding, multiplied diving, exponentiation, combining, hashing, etc. Further, mere knowledge of the parameters is insufficient to gain access to the each of the two or more authorized computers/devices. Further, an individual must also know the functions and how the functions perform. Further, internally generated parameters may include things such as the time, etc. Further, an independently generated may include things such as the current prime rate from a predetermined source, etc. Further, an established QLS relationship (usually unique to each device, user, and account) is required for accessing the each of the two or more authorized computers/devices. Additional access from other computers/devices, users, or accounts must be authorized. Establishing a relationship with the each of the two or more authorized computers/devices requires no human and minimal computer activity. Further, the each of the two or more authorized computers/devices may allow Human oversight. Further, adding more users, or accounts, or changing or restoring information associated with the each of the two or more authorized computers/devices may require human interaction.

Further, the present disclosure describes a process: encryption and access control. Further, the computer or device SEEKING access must generate a QLS encryption key. Further, the device encrypts the data to transmit along with certain identifying information. Further, the information may include "QLS Enabling Information" and normal headers are added to the data and the message is sent to the computer or device GRANTING access. Further, the computer or device GRANTING access receives the message. Further, the enabling information is separated out and uses to generate the encryption key. The message is decrypted and the Identifying information is checked. If the results match the saved relationship data, a connection is established between the computer or device SEEKING access and the computer or device GRANTING access. Further, any unauthorized computers do not include the correct QLS functions and parameters that are necessary to generate a valid encryption key. Further, the unauthorized computers may never decode the message, and cannot gain access. Further, the QLS encryption keys are never saved or re-used. Further, new and different QLS encryption keys are generated for each transaction.

Further, the present disclosure may provide a simple and fast computer transaction. Further, the prevent intrusion from an unauthorized computer(s) even if the unauthorized computer(s) may have complete logon and personal information. Further, the present disclosure prevents hacking, phishing, and the dark web. Further, the present disclosure may be losing value as information sources for gaining access to computers. Further, an entire process is performed without additional user interaction or effort. Further, the process may be implemented with a negligible impact on computer functions. Further, the process works regardless of computer shutdown, power loss, etc. Further, the complexity of intercepting information is increased exponentially. Further, time constraints and constant changes make the intercepting virtually impractical.

Further, the present disclosure may be used in Browsers, Email, FTP, Autonomous Devices, IOT Devices, Networks, Voting Machines, Quantum Computers, Check Fraud prevention, Autonomous equipment updates, etc.

Further, the present disclosure describes creating a secure communication channel between computing devices by separately generating an encryption key based on predetermined function or parameter without storing the encryption key anywhere or without transmitting the encryption key.

Basic Features

Device Id

The proposed method requires that each device have a unique DEVICE ID. Different from other ID's (mac address, etc.) and known only to authorized devices.

Relationship Id The proposed method requires that a relationship be established and assigned a RELATIONSHIP ID that is unique to each set of client device(s), client user(s), server, and account(s). The RELATIONSHIP ID is pre-established. It limits the types of access permitted. It is completely independent of all personal data (that could be hacked from other sources). The relationship ID's are not stored anywhere except on the specific authorized devices. They are created and maintained by the server. On devices that are not fully secure, they (and all other information and software) are retained in encrypted format with the encryption key not available. Relationship ID's are changed regularly using special functions (see below).

"Encryption Keys"

Throughout QLS, Information is encrypted using keys that are generated independently on each device using special functions (see below). Encryption key pairs, initial values, hashes, hash tables, block chains and other potentially compromising information are not used or transmitted between devices. There is no need to transmit encryption keys over a network or the internet. It reduces processing time and computer burden thus allowing the rapid change of encryption keys without the burden of unnecessary transmission.

Each encryption key can be used for only one transaction (not an entire session). Keys are wiped clean (changed to a meaningless value) and then deleted from the memory allocation immediately after each use. Encryption keys do not exist on any device except at the moment of use.

Thus, even if transmitted information were intercepted and decoded, the result would be of NO benefit in the decryption of other subsequently transmitted information. Additionally, the reduced amount of information transmitted using any single key makes breaking the encryption more difficult.

Note: the practice of using multiple keys (public and private) as currently practiced actually results in only a single symmetric key that is then used repeatedly for a session on multiple devices. Repetitive use of a key makes it more vulnerable to interception and malicious activity such as "man in the middle".

"QLS Functions"

Encryption keys are generated using QLS functions that combine information from numerous sources to independently generate identical encryption keys on authorized device(s).

Encryption keys may at various times be pseudo random, random or stochastic encryption keys.

The functions used to perform these manipulations are infinitely variable, and are changed regularly to make it impractical to discern their nature.

The QLS parameters used by the QLS functions also change, some each time a key is generated, some less frequently, (see Below)

The parameters values are manipulated by the function before using the determined value of the parameters.

Thus, in order to generate an encryption key requires knowledge of the function, the parameters it uses, and the manipulations performed.

"Enabling Information"

Enabling information enables QLS functions on independent devices to coordinate their encryption key generation. Enabling information is by design, not sufficient to generate encryption keys. Only the authorized devices have the additional knowledge necessary.

Enabling information could be as simple as a date and time (or some derivative of a date and time that only approved devices can make use of), but generally contains additional information or values known only to authorized devices; but not potential malicious actors.

"Multiple Benefits"

First, it enables rapid generation of, and rapid changes to, encryption keys and initial values without the need to distribute or transmit them. The reduced overhead makes it more practical to change encryption keys not just with each session, but with each transaction, packet, or even encryption block. Malicious decoding then becomes exponentially less practical.

Second, it eliminates the need to retain encryption keys and initial values on a device for their next use. They are simply not available, and so can't be discovered for malicious purposes.

Third, QLS requires a previously established, and duly authorized relationship that is independent of logon and other personal information. It enables a rapid method for detecting intrusion at any level (session, transaction). The method is entirely independent of login information, and personal or corporate or military information that might be derived from compromising data on unrelated devices. Identity information is stored only on authorized devices and generally in encrypted form.

Fourth, the method can be initiated automatically at any level without any user interaction. The method is compatible with all standard logon practices, and can be used concurrently with them or used independently to eliminate logons.

The combined benefits of these changes makes the tasks faced by malicious actors exponentially more complex while simultaneously compressing the time frame available for them to do so, and while drastically reducing the scope and reward if they do succeed. Indeed, since changes can occur with each transaction or even each packet, it can make it impractical to compromise encrypted information or gain unauthorized access.

"The Weak Spot(s)"

Well, if you are going through a bitter divorce and give your soon to be ex your password plus access to your computer, then you may be in for trouble. But, if you are worried about some unknown someone, somewhere getting, your information on the dark web, and then installing malicious software or getting your personal information. It's going to get exponentially more difficult (if not impossible) for them to do that "Multi-Level Security Aka Wrapping"

This method provides for the concurrent use of complex functions each requiring multiple diverse parameters. The functions are infinitely variable; but share certain common properties. A finite subset of functions is available on each device. Different functions are randomly selected for each execution of the method. From time to time, the functions available on a given device are changed to further hinder malicious actions. Each function must result in a different unique parameter each time it is used.

Up to seven information groups contribute to this effort. Each group used by a function is necessary; but not sufficient to develop encryption keys, random seeds, and initial values for encryption algorithms—which by the way, can also be changed. The precise number, type and nature of the parameters in each group is different for each function. Only partial information (insufficient to generate keys and values) is transmitted between devices. All information is triple function. The information must be obtained. Once obtained it is operated on by the functions. In addition, since incorrect values would cause decryption to fail., the outcome must properly decode the information transmitted to confirm identification The first information security group consists of certain identifying information that is known only to approved parties. Indeed, it may be saved in encrypted format with neither party knowing the information.

The second information security group consists of certain experiential information about the parties. Also, known only by authorized parties. These might be things like the last date/time the method was used, or the number of times it has been used since the last update.

The third information security group involves parameters whose nature is known only by authorized parties; and whose values are determined at the time of use. In this group are internal parameters. They might be things such as the time of day when the function was performed, the size of a particular file.

The fourth information security group involves parameters whose nature is known only by authorized parties; and whose values are determined at the time of use. In this group are external parameters. They might be things such as today's opening Dow index, the closing S&P index from one day ago, or the value of a dollar vs the Euro.

In the fifth level, the correct function (there are many stored on each device) must be used. These functions operate on the parameters identified in other levels. The manipulations may be mathematical, algorithmic, algebraic. random functions, pseudo random function, string functions, modulus, Quantum mechanics, FFT, . . . etc. What is important is that they vary the parameters and combine them in unique and (to unauthorized entities) unpredictable ways. Also, that they function the same on all devices involved.

The sixth level, requires that the correct encryption algorithm be used. These may be any encryption algorithm that can function identically on all the devices involved. Obviously, the same algorithm must be used on all devices; but may change from time to time as specified in the function being used.

In a seventh level, multiple encryption techniques are used. For example, QLS encrypted information may be processed through TLS encryption. Or, there may be two layers of QLS encryption.

"Independent Access Control"

The purpose here is to protect devices from unauthorized parties who may try to gain access. The aim is to assure that even malicious actors who may have stolen logon information, or personal information, or use repetitive techniques, should not be able to gain access.

A previously established relationship between authorized devices is required. This entails the posting of certain data on each authorized device so that the following can occur.

Certain "Initial Access Parameters" are generated, and then passed by a device seeking access. Correct "Initial Access Parameters" are necessary, but intentionally not sufficient to generate proper encryption parameters and gain access. Any changes occasioned by interception, man in the middle attacks, etc. will result in failed decryptions on the device granting access. Thus resulting in a denial of access. Any attempt to re-use intercepted communication will similarly fail, because values are constantly changing in unpredictable ways.

Generating the "Initial Access Parameters" is not easy for outside malicious actors to do. They contain information that is not stored anywhere except on authorized devices, nor revealed to anyone (including authorized users and account holders). They also contain other identifying information that would not be available to UN-authorized actors. This may be such matters as the user's access restrictions, file structures, etc. Conventional logon practices can be incorporated; but are not required.

Also passed, are certain previously encrypted identifying information. The device seeking access does not have the encryption key for this data thus lacks the ability to decode it or modify it. Still, some of it must be provided anew in order to confirm identity. If tampered with, then subsequent decoding will fail and access will be denied.

An authorized granting device having received the correct "Initial Access Parameters" will be able to decode its own encrypted information, and then verify the "Initial Access Parameters" and other decoded data with its own records. If the Initial access parameters are not correct, then the decryption will fail, and access will not be granted.

Certain independently collected internet parameters are also checked. It effectively precludes UN-authorized malicious actors from gaining access.

The method can be used, not only at the user/password level (as current logons are); but at the level of a specific user and account with a specific device and even then at a specific access level only. It can be used in addition to other deterrents—I'm not a robot, Text codes, 2 level security, etc. It can happen without user knowledge or input. This is convenient for the user. The method can protect from intrusion without requiring your attention.

When unauthorized access is recognized (excessive repeated attempts), then the source is labelled as "unauthorized". They are allowed to proceed but the lead time for a reply gradually increases, in addition, once marked as "unauthorized" they will not receive any positive response, even if they eventually provide correct information. In addition, the "owner" of record receives an email with complete information.

General Description

Rather than providing for the generation and transmission of encryption keys, this patent relies on the independent generation of identical encryption keys on multiple devices. This enables the rapid generation of encryption keys without the need to transmit them. This, in turn, makes it practical to limit the use each key. Rather than re-using of the same encryption key for the duration of a session of indefinite length, keys can be changed with each transaction. Thus avoiding multiple exposure of a single key to potential malicious conduct. Also, malicious interception and/or decoding of transmission(s) becomes far more difficult and far less productive in that it the key currently in use does not apply to any other communication (past or future). In addition, since the content of each transaction can be dramatically limited in scope, malicious decoding of a single communication can be far more difficult.

The methodology used to coordinate independent devices inherently establishes a protocol that restricts access to specific pre-authorized devices and relationships. The methodology, "QLS Authentication" is independent of, yet compatible with, standard logon processes and encryption protocols. It can also provide, enable, and support the restriction of access privileges that is unique to each relationship and device.

QLS requires a previously established "QLS relationship" between devices. That relationship establishes identifying information that exists ONLY on authorized device(s). Much of it is not known to the user. "QLS authentication" is not dependent on logon and other personal information that could be garnered from the hacking of unrelated data bases or communications, QLS severely diminishes the value of malicious activities such as phishing and the hacking of independent databases, and the interception of communications. Although there are exceptions, QLS's underlying information and processes are retained in encrypted form on each authorized device. Also, as a general rule, the encryption key used is not available on that same device. Various methodologies for decrypting the necessary information when it is needed is provided in the details below.

Process Outline

"QLS Enabling information" makes the generation of identical encryption keys on multiple devices practical. The enabling information is transmitted between devices. However, "Enabling information" alone is not sufficient for un-approved devices or relationships to generate duplicate keys.

The generation and handling of "QLS Enabling information" is performed in accordance with certain special "QLS functions". "QLS functions" have infinite possible variations, although they must each satisfy certain rules.

The specific "QLS function" in use at any given time may be changed with each transaction, or at some other interval. "QLS functions" are changed by selecting from a list of functions available for use on approved device(s) for specific approved relationship(s).

"QLS Functions" define what encryption algorithm is to be used. The algorithm may be any existing algorithms in general use, or algorithms unique to QLS.

"QLS functions" also define the information needed to provide values for the generation of encryption keys by the specified algorithm(s). This information includes "QLS Enabling information", and may also include:

Device and relationship information that is unique to the approved devices, and stored on the approved devices. Such information may, or may not be QLS related and may or may not include things such as mac addresses, system information, browser id, URL, etc.

Information may be obtained from a local network.

Information may be obtained via the internet,

QLS functions may also use (typically as an exclusionary precondition); but may NOT rely upon conventional log on information or other logon security measures.

"QLS functions" also define additional complex data manipulations that are performed on the information obtained as above prior to use by the specified encryption algorithm, "QLS functions" are typically changed at three distinct levels. 1) Selected (typically, but not necessarily at random) with each use from a subset of functions available to each authorized device. 2) Periodic updates of the functions available to each "Client" device with other "QLS functions" selected from a library on the device performing the "Server" function 3). Periodic update of the "Server" device's library with functions selected from the QLS function master library.

The successful decoding of encrypted information received concurrent with the transmitted the "QLS enabling information" is a necessary condition for "QLS Authentication" that cannot be accomplished without all the above information being correct.

QLS Claims

The terms "Client" and "Server" are descriptive of the function being performed in a particular transaction. They do not restrict any device from performing either role in other transactions "Client Device" refers to the device initiating a transaction or transmitting information "Server device" means, the device that grants access to or receives information All QLS protocols can operate within an SSL/TLS environment with minimal delay and exponential increases in security.

QLS relationships, functions, protocols, enabling information and practices, encryption key practices, standard practices and basic implementation are each individually and separately the essentials of the patent (Items 1 to 5 below)

QLS supplements (item 6 and beyond) include further innovations (QLS session, split key, function 0, etc.) that are also significant innovations and claims of this patent. The techniques in those embodiments (sessions, split keys, function 0) can be combined in various ways and with other protocols (such as tls) with sacrificing the patent applicability. QLS embodiment (item 6 and beyond) are claimed, regardless of how they are combined with basic function. The claim is not restricted the specific examples shown to explain their function(s).

1) Previously Established Relationship

Relationship Description

A QLS relationship consists of the storing of information on each authorized device that enables QLS function communications. This includes but is not limited to the generations of identical encryption keys without passing sufficient information to generate those identical keys. The relationship also contains information related to the identification of authorized devices. The relationship also contains information regarding the access privilege limits of each party in each relationship.

On QLS Secure servers' relationship information may be retained without encryption in order to reduce processing time. However, the preferred means is to retain the information in encrypted form without the encryption key present on the device where it is stored.

Essential QLS information is separate from logon information and personal information that is in common usage. It is recorded only on authorized devices. Thus, it cannot be obtained through access to other data bases or web sites.

Portions of relationship information may NOT be disclosed. Administrators of both client or server devices are not permitted access to certain information. Thus reducing the risk of malicious internal personnel cannot compromise the system.

Relationships are normally established either when client opens an "account", or when server or client activates QLS. Server, deciding to grant access generates a unique ID's (device ID and relationship ID). It installs the necessary information in its memory device and then provides appropriate information to client device. Note: relationship data exists only on authorized devices, and cannot be obtained by hacking other data bases, or sites.

Default Access Limitations

Default Privileges—Device(s) unable to establish that they are "authorized" can be rejected, or assigned to a default relationship.

Default Privileges—Must vary with the application. For example, email accounts would likely default to completely deny access to client devices that are not authorized. A commercial web site would more likely default to allow access; but only to view items for sale. An ftp default might allow downloads of free public information; but not uploading of files. Etc.

Of course, authorized accounts will have other pre-set (as part of the relationship) access limitations. In most cases, QLS can supply the "access limitation" information; but most must be implemented in end user software and or operating system(s).

Access Information

Access information includes two unique ID's plus access permission limitations, and other identifying information. The Device ID is unique to each authorized device. The Relationship ID is unique to a specific relationship. Relationships can include any one, or multiple device(s), user(s), account number(s), etc. Each device knows which device(s) and relationship(s) and account(s) it can accept; plus, what privileges are available to the client device.

QLS Information—General Information for the QLS System

The QLS information includes the QLS administrative and functional scripts and subroutines used by the QLS system.

It also includes device specific information and experiential information used to confirm the identity of devices (both client and server).

Also, administrative information used to direct the activities of the QLS system Relationship Information Unique to Each Relationship Relationship information also includes but is not limited to: QLS Functions currently available to generate encryption keys. The relationship information includes a subset of the infinite list of functions and parameters that are available on a master server. It may also include user logon ID and password, plus other logon information such as questions and responses, email addresses, etc.

Enabling Information Unique to Each Relationship and Device

"Enabling information" makes the generation of identical encryption keys possible. However, it must be sufficient only for previously approved devices that participate in the correct relationship and are the sole holders of certain related and necessary information and functions without which duplicate keys could not be generated. Unauthorized client devices cannot generate duplicate keys. Also, authorized devices must be accessing the correct relationship on the correct server device in order to generate duplicate keys. In addition, even approved devices and relationships are limited in access permissions "Enabling information" Does not contain sufficient information for unauthorized devices to generate duplicate keys. Also, authorized devices must be accessing the correct relationship on the correct server device in order to generate duplicate keys. In addition, even approved devices and relationships may be limited by access permissions "Enabling information" that is transmitted between devices must be combined with information available only on pre authorized device(s) that are participating in a specific relationship. In some cases, with additional information (whose source is known only to authorized devices) is independently secured via network/internet transactions.

2) QLS Encryption Keys

QLS Encryption Keys are Unique in that:

1) QLS Encryption keys are not generated until the moment they are needed and then, only on the device where they are needed.

2) The means used to generate those keys is defined by QLS functions. The specific functions currently in use are available only on authorized client and server devices, and may be different for each relationship. QLS functions are randomly selected from a list of available functions on each device. The available functions are updated periodically from a master list of "infinite" functions.

3) Each QLS encryption keys is unique and used only once. It is then "wiped" and removed from memory immediately after use.

4) QLS Keys are not transmitted over a network or internet.

3) QLS Functions

Function Description

QLS FUNCTIONS are infinitely variable complex functions that use certain parameters and manipulations (the specific parameters and manipulations being unique to each function) in order to generate identical encryption keys on multiple devices without transmitting encryption keys over a network or the internet. The functions also serve to confirm the authorization of the transmitting device involved in that improper information results in faulty decoding information.

Function Properties

Variation of functions—Functions are randomly varied by selecting from a number of functions available on each authorized device. Typically, a client device might have some number in the hundreds to select from, Functions on each device are periodically replaced to prohibit observation of repetitive patterns. Typically, a server device might have some thousands of functions that are randomly rotated amongst client devices. An "infinite" number of functions are maintained on a Master Server that periodically updates devices.

Operation on parameters—The value of each parameter used by the function may be operated on (modified/manipulated) before use in generating keys. Thus, absent knowledge of the details of the function currently in use, intercepted of parameter information would not enable the generation of valid encryption keys.

Variation of Parameters—The values of some parameters used by each function change without communication each time a function is re-used. Thus each generation of an encryption key results in in a unique key, even if the same protocol is used more than once.

Function Information Sources "Parameters"

Enabling information—Parameter selections and/or information may be transmitted as part of the enabling information. The source and nature of the data is part of each function and known only to authorized devices.

Local Information (information available on the device)—Information that is available on each approved device. This may be relationship information; or other information available on the device. The source and nature of the data is part of each function and known only to authorized devices. (e.g. the last date of change for some QLS file, etc.)

Independent Information—Information secured from external sources (e.g. internet or network). The source and nature of the data is part of the function and known only to authorized devices.

Trojan Horse Information—Information that may be available from any source. (E.g. server may acquire clients operating system or browser type and revision, IP address, etc.)

Function Requirements

1, Functions must be able to generate identical encryption keys on multiple devices If used repeatedly, they must generate different encryption keys each time they are used.

2. The enabling information that provides coordination, must not be sufficient to generate identical encryption keys without additional information known only to the authorized devices, and not transmitted with the enabling information.

3. The function used must be randomly re-selected each for each QLS session.

4. The function must recognize an error if enabling information is not as expected.

5. Functions must manipulate and combine information from multiple sources in order generate initial values for random number generators, and encryption algorithms.

6. The function format must be capable of using information from each of the following categories. 1: Enabling information, 2 Information derived from data on the device, 3 External information derived from the network or internet.

Function Utility Analysis

For example: Some QLS function "AA" might use a random number generator. The enabling information might include a value for the parameter "time". "Time" being the time at which the client generated the encryption key. That time though, would have been manipulated by function "AA" before it was used. The manipulation might be: add to the time, a number of seconds calculated as . . . the "square root of the date mod 60".

So what? You say. Well, even if some malicious actor were to intercept the enabling information and even if they recognized the time as being a "time", and even if they realized that the "time" is being used as a seed for a random number generator (and that's a whole lot in and of itself). The enabling information would still be of no value since the QLS function was not transmitted with the enabling information and they do not have knowledge of the nature of the QLS function's manipulation.

Even if the same QLS function were used again without fresh enabling information, the repeated use of the random number generator with re-seeding will result in different results for each use. In that case, the enabling information might include a number indicating the number of random generations to skip as a parameter.

And, even if the same QLS function were used again with fresh enabling information, the "time" and manipulations values will change and so will the encryption key.

And, depending on the user options selected, QLS may change at any time to some other QLS function "BA" or "DDD". And that may not use "time" at all, or may perform a different manipulation.

And, all the above is just one parameter. QLS function use multiple parameters. The majority of which are NOT transmitted with the enabling information; but secured by other means.

so their super/quantum computer is super-fast and can try 10, being 73 zeros) different encryption keys in a fraction of a second. Well, they still have obstacles. 1) Depending QLS options selected, data may be double encrypted. They'll have a problem figuring out when they got the initial encryption correct. 2) User options can break a transmission down into small segments "packets". Each packet will go with a different encryption key. And each packet can be less than 256 bits, thus making it far more difficult or perhaps even impossible to decode.

4) QLS—Standard Practices

Note 1: Client Device and Server Device have an established relationship. That relationship was established either when client opened an "account" with server, or when QLS was activated. Server deciding to grant access generates unique ID's and installs the necessary information in its memory device and then provides appropriate information to the client device. Note: relationship data exists only on authorized devices, and cannot be obtained by hacking other data bases, or sites.

Note 2: Updates are changes to functions, subroutines and scripts, etc.

Note 3: QLS Secure Devices are devices on which all incoming contacts are vetted by QLS authentication. And limited in privileges in accordance with QLS (or equivalent). On all other devices, QLS information is stored in encrypted form with the encryption key not present on the device.

Note 4: Standard Activities

"QLS Transmit" The device chooses, at random, a previously provided function and uses it to generate an encryption key. The device then encrypts "the information to be transmitted". The device appends enabling information and transmits. The device wipes the encryption key and frees the memory.

"QLS Receive" The device receives the transmission and parses the enabling information. The device uses the specified function to generate an encryption key. The device decodes the information received The device wipes the encryption key and frees the memory. Relationship data from insecure clients has been multiple encrypted and must also be decoded using "Prior QLS" information.

"QLS Authentication" Authentication confirms the identity and authorization of both client and server.

Multiple attempts from the same source trigger an error protocol.

QLS maintains access privilege and limits QLS activities appropriately. QLS posts access information for use by system and software. However, QLS cannot implement changes to related programs and operating systems to implement those restrictions. There are multiple levels available who's premises are:

Level 1: The successful decoding of transmissions can only be accomplished if both devices are authorized in the relationship.

Level 2: As Above, plus: Transmitted enabling, identification and relationship information can only be correct if the sender is authorized in the relationship.

Level 3: As above, plus: "Trojan Horse" information that was stored on each authorized device and is obtained independently by the server can only match if the sender is authorized in the relationship.

5) QLS "BASIC Implementation"—Single Data Transmission.

QB1) Client Device concatenates certain previously saved relationship data and user data with information to be transmitted. Client Device then performs a "QLS transmit"

QB2) Server performs a QLS Receive

QB2a) If properly decrypted and authenticated and there are no error flags, then the server device generates QLS Client update information and transmits.

QB2b) In the event of improper decryption, failed authentication, error flag(s), or improper client device information then Server device generates appropriate error messages, and sets error flags. Server device then performs a "QLS transmit"

QB3) Client device receiving the message performs a "QLS Receive".

QB3a) If there are no error messages, Client device saves the client updates.

QB3b) In the event of improper decryption, failed authentication, error flag (s), or improper server device information then client device generates appropriate error messages, and sets error flags.

QB4) Client device performs a "QLS Transmit".

QB5) Server receives and performs a "QLS Receive".

QB5a) If there are no errors, then server device saves the server updates, and QLS transmits a confirmation receipt QB5a) If there are errors, then server transmits rejection receipt and error messages then re-directs to an error routine.

QB6) Client receives response and "QLS receives"

6) QLS "BASIC Packets Implementation"—

QB0) User specifies packet size.

QB1) Client Device Parses a packet, then concatenates certain previously saved relationship data and user with packet to be transmitted. Client Device then performs a "QLS transmit". Client repeats until complete QB2) Server performs a QLS Receive, appends packets and repeats until complete.

QB2a) If properly decrypted and authenticated and there are no error flags, then the server device generates QLS Client update information and transmits.

QB2b) In the event of improper decryption, failed authentication, error flag(s), or improper client device information then Server device generates appropriate error messages, and sets error flags. Server device then performs a "QLS transmit"

QB3) Client device receiving the message performs a "QLS Receive".

QB3a) If there are no error messages, Client device saves the client updates.

QB3b) In the event of improper decryption, failed authentication, error flag (s), or improper server device information then client device generates appropriate error messages, and sets error flags.

QB4) Client device performs a "QLS Transmit".

QB5) Server receives and performs a "QLS Receive".

QB5a) If there are no errors, then server device saves the server updates, and QLS transmits a confirmation receipt QB5a) If there are errors, then server transmits rejection receipt and error messages then re-directs to an error routine.

QB6) Client receives response and "QLS receives"

7) QLS "Secure Device Session"

General Description

Both the Client and server are secure (as described above), and so it is not essential to encrypt QLS information on the devices.

The embodiment also includes a protocol for "sessions" That protocol is different from existing processes in that the encryption key is changed with each transaction. (e.g. each web page, or each file transfer, or . . . ). This selection can be initiated by the client by either sending enabling information (resulting in a new encryption key), or by omitting the enabling information in favor of repeated use of the QLS function which automatically changes the encryption key.

Details

QS1) Client Device concatenates previously saved relationship data with user information to be transmitted to constitute "the total information to be transmitted". Client Device then performs a "QLS transmit"

QS2) Server performs a QLS Receive Relationship data from insecure clients has been multiple encrypted and must also be decoded using "Prior QLS" information.

QS2a) If properly decrypted and authenticated and there are no error flags, then QS2a1) the server processes the data received.

QS2a2) the server device generates QLS Client update information and transmits.

QS2b) In the event of improper decryption, failed authentication, error flag(s), or improper client device information then Server device generates appropriate error messages, and sets error flags. Server device then performs a "QLS transmit"

QS3) Client device receiving the message performs a "QLS Receive".

Relationship data from insecure Servers has been multiple encrypted and must also be decoded using "Prior QLS" information.

QS3a) If there are no error messages, Client device saves any updates. Otherwise it posts appropriate error messages.

QS3b) In the event of improper decryption, failed authentication, error flag (s), or improper server device information then client device generates appropriate error messages, and sets error flags. Client device then performs a "QLS transmit"

QS4) Client device performs a "QLS Transmit".

Qs5) Server performs a "QLS Receive". If there are no errors, then server B saves the updates. Otherwise, it transmits error messages or re-directs to an error routine.

QSN1) Client performs QLS Receive, and authenticates server.

QSN1a) If server authenticated client processes information

QSN1b) If server not authentication client generates error message

QSN1c) If server authentication and end of session message session terminated.

QSN2) Client concatenates information and performs QLS transmit

QSN3) Server performs QLS receive and Authenticates Client

QSN3a) If Client authenticated server processes information from client

QSN3b) If Client not authentication client generates error message

QSN3c) If Client authentication and end of session message session terminated.

QSN4) Server Concatenates and performs QLS Transmit
{Cycle repeats at QSN2 until timeout or session complete message received}

8) QLS "In-Secure Device Session"—Split Key

General Description

An encryption key was previously split into two or more segments. Some segments from each key are retained on the client device(s) and some on the server device. The segments need not be contiguous nor equally divided.

The client provides its segments to the server; but the server does not respond with its segments; so the complete key is not transmitted.

Once properly assembled the key can be used by the server to enable it to decode limited QLS processes and "prior QLS enabling information".

The server then transmits "prior QLS enabling information" and limited scripts to the client, thus enabling an authorized client to access its own QLS information.

The split keys are revised with each use as part of the update section of the basic QLS protocol. QLS operating information is similarly re-encrypted with each use.

Details

QI1) Client cannot access its own encrypted QLS information. It concatenates its Device ID with "split key" previously saved and certain other pre-arranged unique information and transmits to the server device.

QI2) Server device receives the transmission. Server then parses the received key segment(s). Server merges those segment(s) with its own segment(s). If correct information was received for the device ID provided and if other pre-arranged information is as expected, then the Server can decode limited portion of Its own QLS information. This in turn, enables server to perform further authentication.

QI2a) If authenticated then server provides enabling information for a previous QLS transaction to the client, along with limited QLS processes.

QI2b) If not properly authenticated, an error process is invoked.

QI3 Client receives the prior QLS enabling information and limited scripts. Thus, enabling it to generate an encryption key and decode its own QLS information.

QI3a) If server is authenticated then Client proceed with basic QLS processes

QI2b) If not properly authenticated, an error process is invoked.

Notes

If client transmits improper information, server will not be able to decode. If client transmission does not match server information for the device ID provided, then server will not respond, and/or client will not be able to decode its information Masquerading os client or server, or Interception of transmissions will not provide sufficient information to pass.

If client has been fully compromised (e.g. disc image has been maliciously downloaded) then information such as mac address, and URL must match. In addition, further verification is required under the basic QLS process that ensues.

9) QLS "in-Secure Device Session"—Function "0"

General Description

The client sends only it's device ID to request access. If available information such as mac address, and URL matches the client ID, then server sends the special "function 0" and certain limited related scripts.

The "prior QLS enabling information" and limited scripts enable the client, to access its own QLS information.

The split keys are revised with each use as part of the update section of the basic QLS protocol. QLS operating information is similarly re-encrypted with each use.

Details

QI1) Client cannot access its own encrypted QLS information. It concatenates its Device ID with "split key" previously saved and certain other pre-arranged unique information and transmits to the server device.

QI2) Server device receives the transmission. Server then parses the received key segment(s). Server merges those segment(s) with its own segment(s). If correct information was received for the device ID provided and if other pre-arranged information is as expected, then the Server can decode limited portion of Its own QLS information. This in turn, enables server to perform further authentication.

QI2a) If authenticated then server provides enabling information for a previous QLS transaction to the client, along with limited QLS processes.

QI2b) If not properly authenticated, an error process is invoked.

QI3 Client receives the prior QLS enabling information and limited scripts. Thus, enabling it to generate an encryption key and decode its own QLS information.

QI3a) If authenticated then Client proceed with basic QLS processes

QI2b) If not properly authenticated, an error process is invoked.

Notes

If client transmits improper information, server will not be able to decode. If client transmission does not match server information for the device ID provided, then server will not respond, and/or client will not be able to decode its information Masquerading os client or server, or Interception of transmissions will not provide sufficient information to pass. If client has been fully compromised (e.g. disc image has been maliciously downloaded) then further verification is required under the basic QLS process that ensues.

Referring now to figures, FIG. 1 is an illustration of an online platform 100 consistent with various embodiments of the present disclosure. By way of non-limiting example, the online platform 100 to facilitate establishing a connection between an access-seeking device and an access granting device may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), and databases 114 over a communication network 104, such as, but not limited to, the Internet. Further, users of the online platform 100 may include relevant parties such as, but not limited to, end-users, users, administrators, and so on. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 2400.

Figure 2:
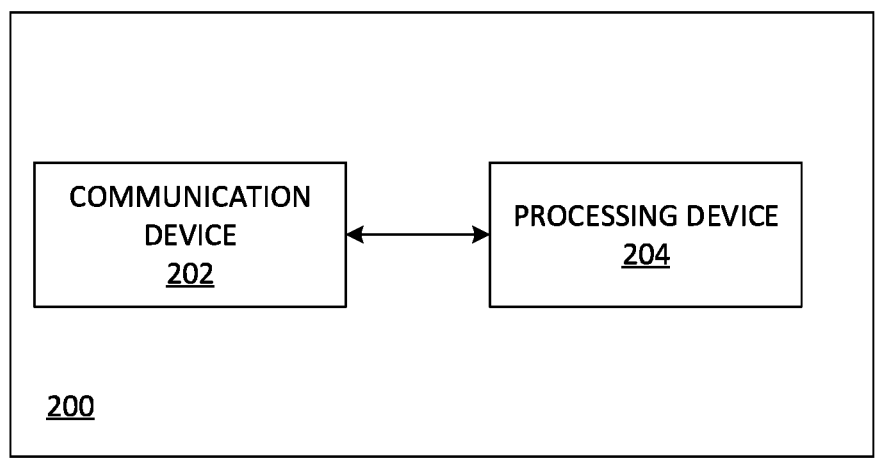
FIG. 2 is a block diagram of a system to facilitate establishing a connection between an access-seeking device and an access granting device, in accordance with some embodiments.

FIG. 2 is a block diagram of a system 200 to facilitate establishing a connection between an access-seeking device and an access granting device, in accordance with some embodiments. Further, in some embodiments, the system may enable unpredictably changing encryption keys on one or more authorized devices without transmitting and/or negotiating one or more encryption keys and without incurring the consequential time delays that would be involved in such effort. Accordingly, in some instances, the system may be utilized to stymie pattern recognition by limiting the amount of information transmitted with any given encryption key and/or encryption method and/or encryption cypher to a level that does not support pattern recognition. Also, the system facilitates to devalue brute force decryption by severely limiting the amount of information disclosed by any such decryption. This may be further enhanced, by the "wrapping" of QLS encrypted information using conventional techniques such that even a successful brute force decryption cannot be recognized as such without a second tier of brute force decryption. Thus, the system facilitates exponentially increasing the effort involved and drastically diminishing the value of quantum decryption. Thus, offering enhanced "quantum level security".

The system 200 may include a communication device 202 and a processing device 204. Further, the communication device 202 may be configured for receiving a Quantum Level Security (QLS) code from the access-seeking device. Further, the QLS code may be generated by the access-seeking device based on at least one QLS function and at least one parameter.

In some embodiments, at least one of the at least one QLS function and the at least one parameter may be configured to generate a new QLS code corresponding to each time a service is accessed by the access-seeking device.

In further embodiments, at least one of the at least one QLS function and the at least one parameter may be configured to change unpredictably over time.

In some embodiments, each of the at least one QLS function and the at least one parameter may be unique to a relationship between the access granting device and the access-seeking device.

In some embodiments, the QLS code may not be stored on a storage media.

In some embodiments, at least one QLS code may include a plurality of QLS code and the at least one parameter comprises a plurality of parameters.

Further, the communication device 202 may be configured for receiving an independent QLS code generated by the access granting device based on the at least one QLS function and the at least one parameter.

Further, the communication device 202 may be configured for establishing the connection between the access-seeking device and the access granting device based on a result of comparing.

In some embodiments, the establishing may be performed based on the QLS code being identical to the independent QLS code.

Further, the processing device 204 may be configured for comparing the QLS code and the independent QLS code.

In further embodiments, the communication device 202 may be further configured for performing a data transfer between the access granting device and the access-seeking device based on the establishing. Further, the processing device 204 may be further configured for encrypting data associated with the data transfer based on the QLS code prior to performing the data transfer.

In further embodiments, the processing device 204 may be further configured for detecting an improper access attempt based on the comparing and generating a notification based on the detecting. Further, the communication device 202 may be configured for transmitting the notification to an authorized device associated with the at least one QLS function and the at least one QLS parameter. Further, the notification may not be transmitted to the access-seeking device.

Further, in some embodiments, once access is granted, one or more changes to at least one of one or more encryption keys, one or more encryption algorithms (cyphers), one or more parameters and one or more QLS functions may be ongoing in order to hinder unauthorized interception and access to transmitted information.

Figure 3:
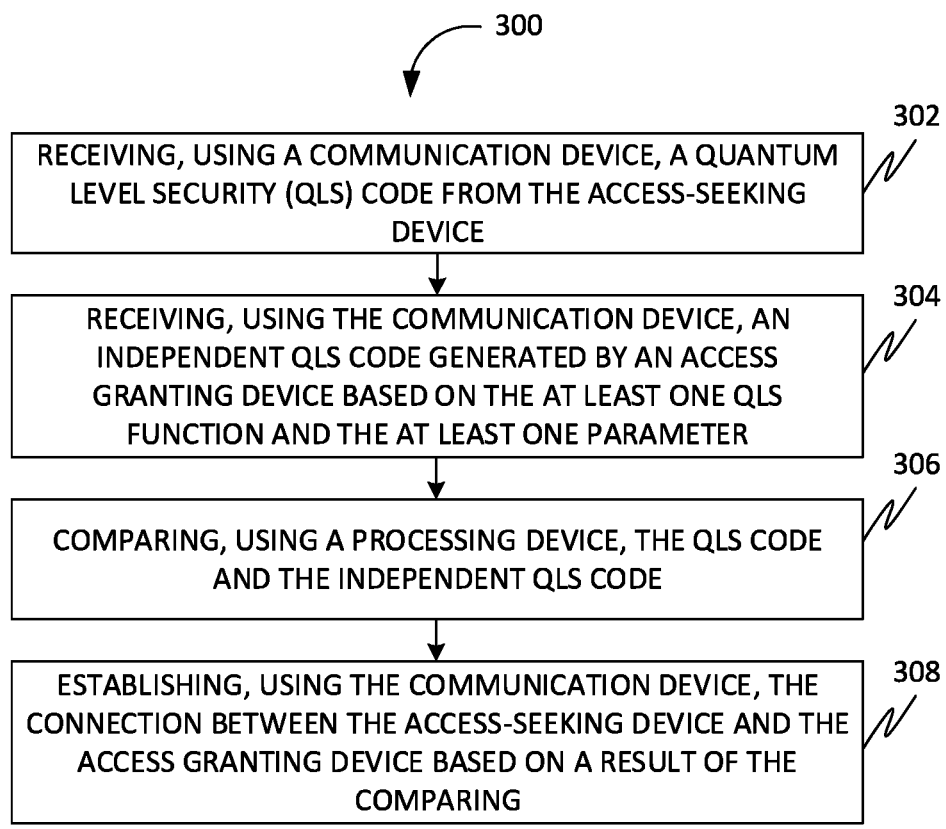
FIG. 3 is a flow chart of a method to facilitate establishing a connection between an access-seeking device and an access granting device, in accordance with some embodiments.

FIG. 3 is a flow chart of a method 300 to facilitate establishing a connection between an access-seeking device and an access granting device, in accordance with some embodiments.

At 302, the method 300 may include receiving, using a communication device, a Quantum Level Security (QLS) code from the access-seeking device. Further, the QLS code may be generated by the access-seeking device based on at least one QLS function and at least one parameter.

In some embodiments, at least one of the at least one QLS function and the at least one parameter may be configured to generate a new QLS code corresponding to each time a service is accessed by the access-seeking device.

In further embodiments, at least one of the at least one QLS function and the at least one parameter may be configured to change unpredictably over time.

In some embodiments, each of the at least one QLS function and the at least one parameter may be unique to a relationship between the access granting device and the access-seeking device.

In some embodiments, the QLS code may not be stored on a storage media.

In some embodiments, the at least one QLS code may include a plurality of QLS code and the at least one parameter comprises a plurality of parameters.

Further, at 304, the method 300 may include receiving, using the communication device, an independent QLS code generated by an access granting device based on the at least one QLS function and the at least one parameter.

Further, at 306, the method 300 may include comparing, using a processing device, the QLS code and the independent QLS code.

Further, at 308, the method 300 may include establishing, using the communication device, the connection between the access-seeking device and the access granting device based on a result of the comparing.

In some embodiments, the establishing may be performed based on the QLS code being identical to the independent QLS code.

In some embodiments, the method 300 may include performing, using the communication device, a data transfer between the access granting device and the access-seeking device based on the establishing.

In further embodiments, the method 300 may include encrypting, using the processing device, data associated with the data transfer based on the QLS code prior to performing the data transfer.

Figure 4:
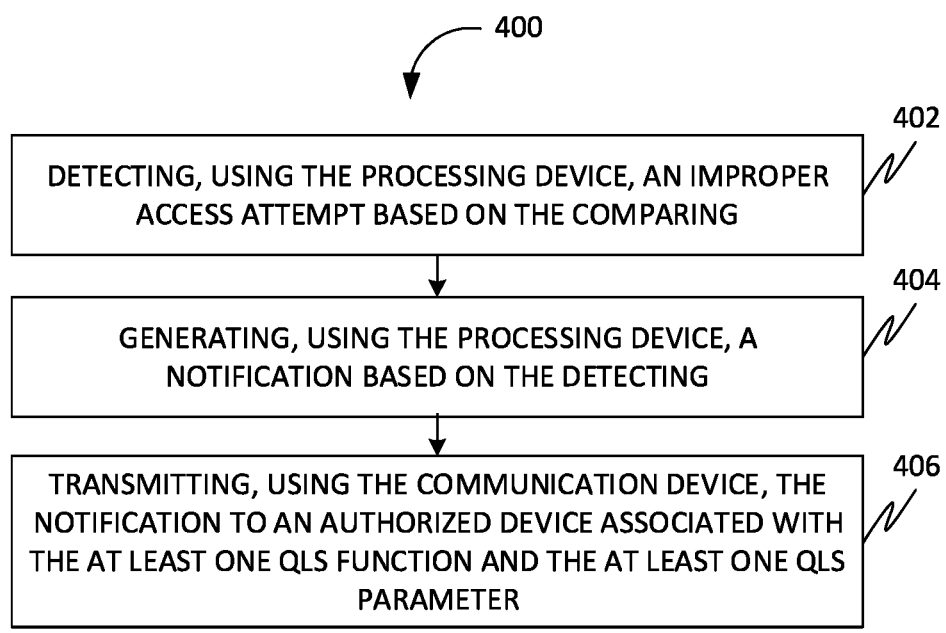
FIG. 4 is a flow chart of a method for sending a notification to an authorized device, in accordance with some embodiments.

FIG. 4 is a flow chart of a method 400 for sending a notification to an authorized device, in accordance with some embodiments.

At 402, the method 400 may include detecting, using the processing device, an improper access attempt based on the comparing.

Further, at 404, the method 400 may include generating, using the processing device, the notification based on the detecting.

Further, at 406, the method 400 may include transmitting, using the communication device, the notification to the authorized device associated with the at least one QLS function and the at least one QLS parameter. Further, the notification is not transmitted to the access-seeking device.

FIGS. 5-23 provide process flow charts for the basic process and several ancillary processes that are used in concert with the basic process. Ancillary processes are presented in specific situations to best describe their function; but are not limited to those circumstances. Ancillary processes can be combined with the basic process in many ways. These Ancillary processes include practices for secure devices, insecure devices, encryption of small fragments, QLS sessions (that are efficient even though they do not use a single encryption key for the entire session), etc.

Figure 5:
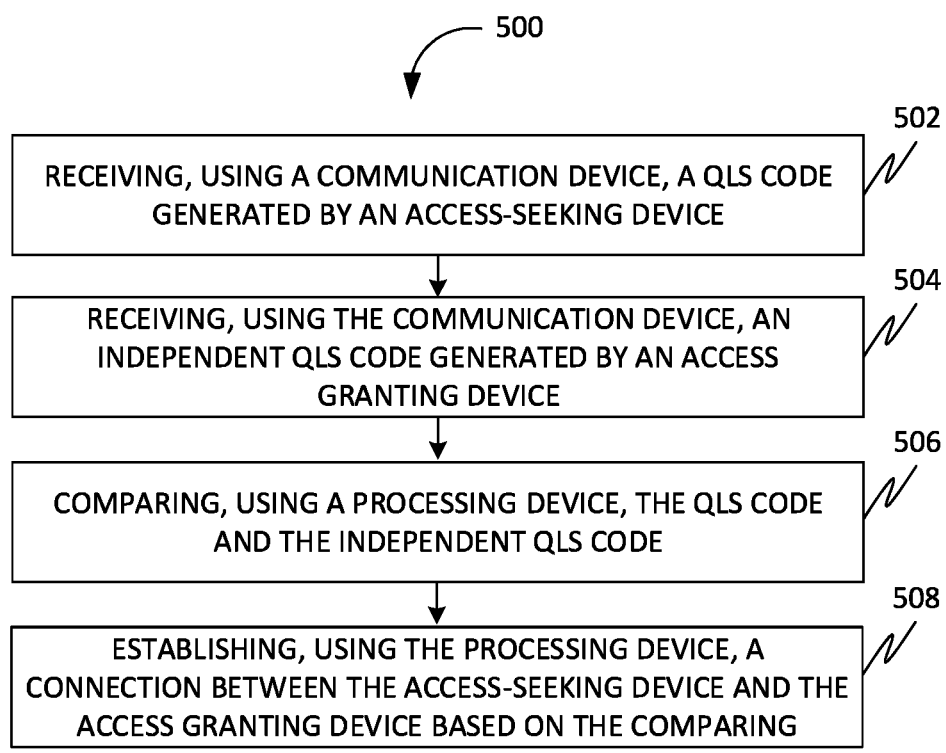
FIG. 5 shows a flowchart of a method to facilitate establishing a connection between an access-seeking device and an access granting device, in accordance with some embodiments.

FIG. 5 illustrates a flowchart of a method 500 to facilitate establishing a connection between an access-seeking device and an access granting device, in accordance with some embodiments. Accordingly, the method 500 may include a step 502 of receiving, using a communication device, a QLS code generated by an access-seeking device. Further, the QLS code, in an instance, may be a quantum level security code that may be encrypted and/or may be generated by the access-seeking device. Further, the access-seeking device, in an instance, may be a client device that may request an information and/or service (such as, but not limited to, a website, a transaction etc.) from a server and/or may wish to access the information and/or services provided by the server. Further, the access-seeking device, in an instance, may be any device through which any information and/or service may be accessed. Further, the access-seeking device, in an instance, may include, but not limited to, a smartphone, a pc, a laptop, a quantum computer etc. Further, the access-seeking device, in an instance, may use special QLS functions and/or parameters that may be configured to generate the QLS code. Further, the QLS functions and/or parameters, in an instance, may be configured to generate new and/or unique QLS code each time when the information and/or service may be accessed by the access-seeking device. Further, the QLS functions and/or parameters, in an instance, may be configured to be changed with time in an unpredictable manner that may limit a practicality of discerning a pattern by keeping a history of prior QLS code. Further, the QLS functions and/or parameters, in an instance, may be unique to each relationship (between the server and/or the client) and/or may be saved in an encrypted form (based on quantum link protocols). Further, the QLS code, in an instance, may never be saved and/or re-used by the access-seeking device for accessing the information and/or service. Further, the QLS code, in an instance, may not be intercepted by malicious access (such as by a hacker) to the access-seeking device. Further, a probability for the hacker to guess the QLS code, in an instance, may be as low as 1/11580000000 . . . (with 74 zeros).

Further, the method 500 may include a step 504 of receiving, using the communication device, an independent QLS code generated by an access granting device. Accordingly, the access granting device, in an instance, may be a server computer and/or device that may be configured to provide resources and/or services (such as an access to, but not limited to, a website, a database etc.) to a network. Further, the network, in an instance, may be a group of one or more computer systems and/or devices that may be communicatively linked with each other. Further, the network, in an instance, may include client devices such as (but not limited to) the access-seeking devices. Further, the access granting device, in an instance, may be configured to generate the independent QLS code by using the QLS function and/or parameter. Further, the independent QLS code, in an instance, may be the QLS code that may be generated independently by the access granting device by using the QLS function and/or parameters (based on quantum link protocols).

Further, the method 500 may include a step 506 of comparing, using a processing device, the QLS code, and the independent QLS code. Accordingly, the online platform 100, in an instance, may be configured to compare the QLS code generated by the access-seeking device (such as the client) with the independent QLS code generated by the access granting device (such as the server) in order to determine if a connection between the client and the server may be allowed or not.

Further, the method 500 may include a step 508 of establishing, using the processing device, a connection between the access-seeking device and the access granting device based on the comparing. Accordingly, the online platform 100, in an instance, may be configured to establish the connection between the access-seeking device (the client) and the access granting device (the server) if, and only if, the QLS code and the independent QLS code may be recognized to be same by the online platform 100 based on the comparing. Further, the connection between the server and the client, in an instance, may allow communication and/or data transfer between the server and the client. Further, an unauthorized computer and/or device, in an instance, may not know the correct QLS functions and/or parameters that may be necessary to generate a valid QLS code. Further, the unauthorized computer and/or device, in an instance, may be any device that may be used by an unauthorized user (such as a hacker) for hacking and/or phishing purposes. Further, the unauthorized computer and/or device, in an instance, may not provide the valid QLS code as the probability of guessing the QLS code may be as low as 1/11580000000 . . . (with 74 zeros). Further, the probability of guessing the QLS code, in an instance, may be reduced exponentially in a case where a multiple QLS code may be required from the access-seeking device and/or the access granting device. Further, an improper access attempt by the unauthorized computer and/or device, in an instance, may result in a notification to a real account owner (an authorized client), and/or proper authorities. Further, the online platform 100, in an instance, may be configured to transmit the notification to alert the real account owner about the improper access attempt. The notification, in an instance, may include one or more information (such as, but not limited to, a URL, an IP address etc.) associated with the unauthorized computer and/or device that may have attempted the improper access. Further, the unauthorized computer and/or device, in an instance, may not be given any notice for denied access.

Figure 6:
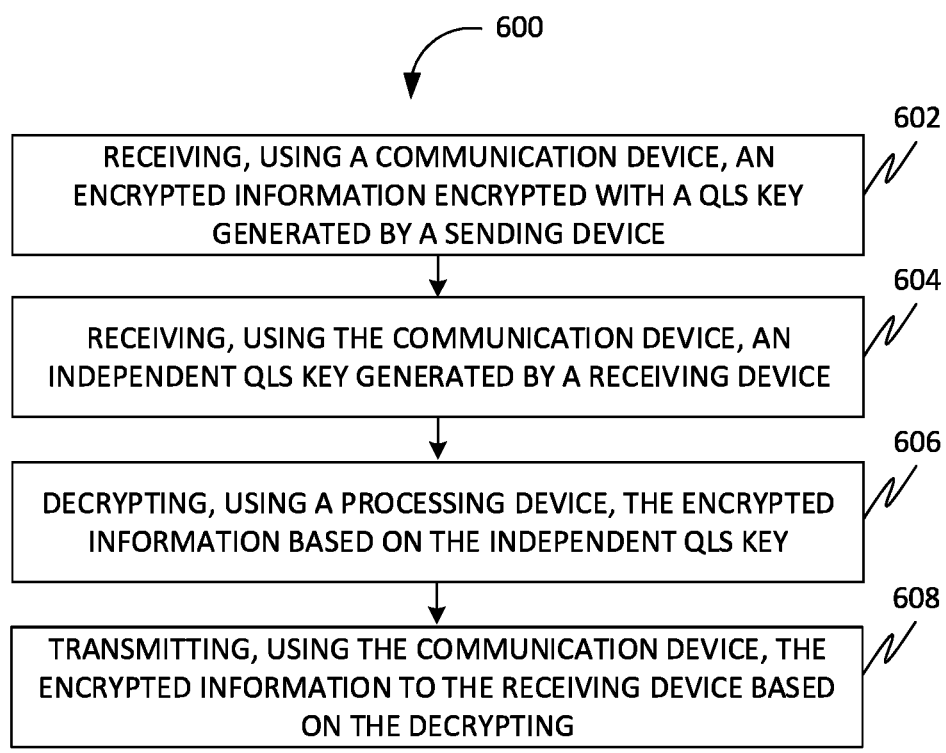
FIG. 6 shows a flowchart of a method to facilitate data transfer security between a sending device and a receiving device based on quantum level security, in accordance with some embodiments.

FIG. 6 illustrates a flowchart of a method 600 to facilitate data transfer security between a sending device and a receiving device based on quantum level security, in accordance with some embodiment. Accordingly, the method 600 may include a step 602 of receiving, using a communication device, an encrypted information encrypted with a QLS key generated by a sending device. Accordingly, the encrypted information, in an instance, may be any encrypted data that may need to be transferred securely between a sending device and a receiving device. Further, the sending device, in an instance, may be an IoT based computer and/or a device that may be configured to send the encrypted information to the receiving device. Further, the sending device, in an instance, may include, but not limited to, a PC, a smartphone, a smartwatch, a laptop etc. Further, the sending device and/or the receiving device, in an instance, may be authorized computers and/or devices that may use special QLS functions and/or parameters to independently generate encryption keys (the QLS key). Further, the QLS key, in an instance, may be an encryption key that may be used to encrypt the data that may need to be transferred securely. Further, the QLS key, in an instance, may be generated by the sending device based on the QLS functions and/or parameters. Further, the QLS functions and/or parameters, in an instance, may be configured to generate new and/or unique QLS key each time when the data may need to be encrypted by the sending device. Further, the QLS functions and/or parameters, in an instance, may be configured to be changed with time in an unpredictable manner that may limit a practicality of discerning a pattern by keeping a history of prior QLS keys. Further, the QLS functions and/or parameters, in an instance, may be unique to each relationship (between the sending device and/or the receiving device) and/or may be saved in an encrypted form (based on quantum link protocols). Further, the QLS key, in an instance, may never be saved and/or re-used by the sending device for encrypting the data. Further, the QLS key, in an instance, may never be transmitted over the internet and/or a network. Further, the QLS key, in an instance, may not be intercepted and/or obtained by malicious access (such as by a hacker) to a device. Further, a probability for the hacker to guess the QLS key, in an instance, may be as low as 1/11580000000 . . . (with 74 zeros). Further, the QLS functions and/or parameters, in an instance, may consist internally generated information based on which the QLS key may be generated. The internally generated information, in an instance, may include, but not limited to, variables that may be a function of the sending device's clock time.

Further, the method 600 may include a step 604 of receiving, using the communication device, an independent QLS key generated by a receiving device. Accordingly, the independent QLS key, in an instance, may be an encrypted key that may be generated independently by the receiving device based on a QLS function and/or parameter. Further, the independent QLS key, in an instance, may be decryption key that may be used to decrypt the encrypted information that may need to be received securely. Further, the independent QLS key, in an instance, may be generated by the receiving device based on the QLS functions and/or parameters. Further, the QLS functions and/or parameters, in an instance, may be configured to generate new and/or unique independent QLS key each time when the encrypted information from the sending device may need to be decrypted by the receiving device. Further, the QLS functions and/or parameters, in an instance, may be configured to be changed with time in an unpredictable manner that may limit a practicality of discerning a pattern by keeping a history of prior independent QLS keys. Further, the QLS functions and/or parameters, in an instance, may be unique to each relationship (between the sending device and/or the receiving device) and/or may be saved in an encrypted form (based on quantum link protocols). Further, the independent QLS key, in an instance, may never be saved and/or re-used by the receiving device for decrypting the encrypted information. Further, the independent QLS key, in an instance, may never be transmitted over the internet and/or a network. Further, the independent QLS key, in an instance, may not be intercepted and/or obtained by malicious access (such as by a hacker) to a device. Further, a probability for the hacker to guess the independent QLS key, in an instance, may be as low as 1/11580000000 . . . (with 74 zeros). Further, the QLS functions and/or parameters, in an instance, may consist internally generated information based on which the independent QLS key may be generated. The internally generated information, in an instance, may include, but not limited to, variables that may be a function of the receiving device's clock time.

Further, the method 600 may include a step 606 of decrypting, using a processing device, the encrypted information based on the independent QLS key. Accordingly, the online platform 100, in an instance, may be configured to decrypt the encrypted information received from the sending device based on the independent QLS key received from the receiving device. Further, the decryption of the encrypted information with the independent QLS key, in an instance, may verify and/or authenticate the receiving device to be a valid recipient of the encrypted information. Further, the valid recipient of the encrypted information, in an instance, may be a computer and/or a device (that may include the receiving device) that may be configured to generate the same QLS key as generated by the sending device using the QLS functions and/or parameters.

Further, the method 600 may include a step 608 of transmitting, using the communication device, the encrypted information to the receiving device based on the decrypting. Accordingly, if the decrypting of the encrypted information, in an instance, may be successful with the independent QLS key, then the receiving device may be considered to be the valid recipient of the encrypted information. Further, an unauthorized computer and/or device, in an instance, may not know the correct QLS functions and/or parameters that may be necessary to generate a valid independent QLS key. Further, the unauthorized computer and/or device, in an instance, may be any device that may be used by an unauthorized user (such as a hacker) for hacking and/or phishing purposes. Further, the unauthorized computer and/or device, in an instance, may not provide the valid independent QLS key as the probability of guessing the independent QLS key may be as low as 1/11580000000 . . . (with 74 zeros). Further, the probability of guessing the independent QLS key, in an instance, may be reduced exponentially in a case where a multiple independent QLS keys may be required from the receiving device. Further, an improper access attempt by the unauthorized computer and/or device, in an instance, may result in a notification to a real account owner (such as the valid recipient), and/or proper authorities. Further, the online platform 100, in an instance, may be configured to transmit the notification to alert the real account owner about the improper access attempt. The notification, in an instance, may include one or more information (such as, but not limited to, a URL, an IP address etc.) associated with the unauthorized computer and/or device that may have attempted the improper access. Further, the unauthorized computer and/or device, in an instance, may not be given any notice for denied access.

Figure 7:
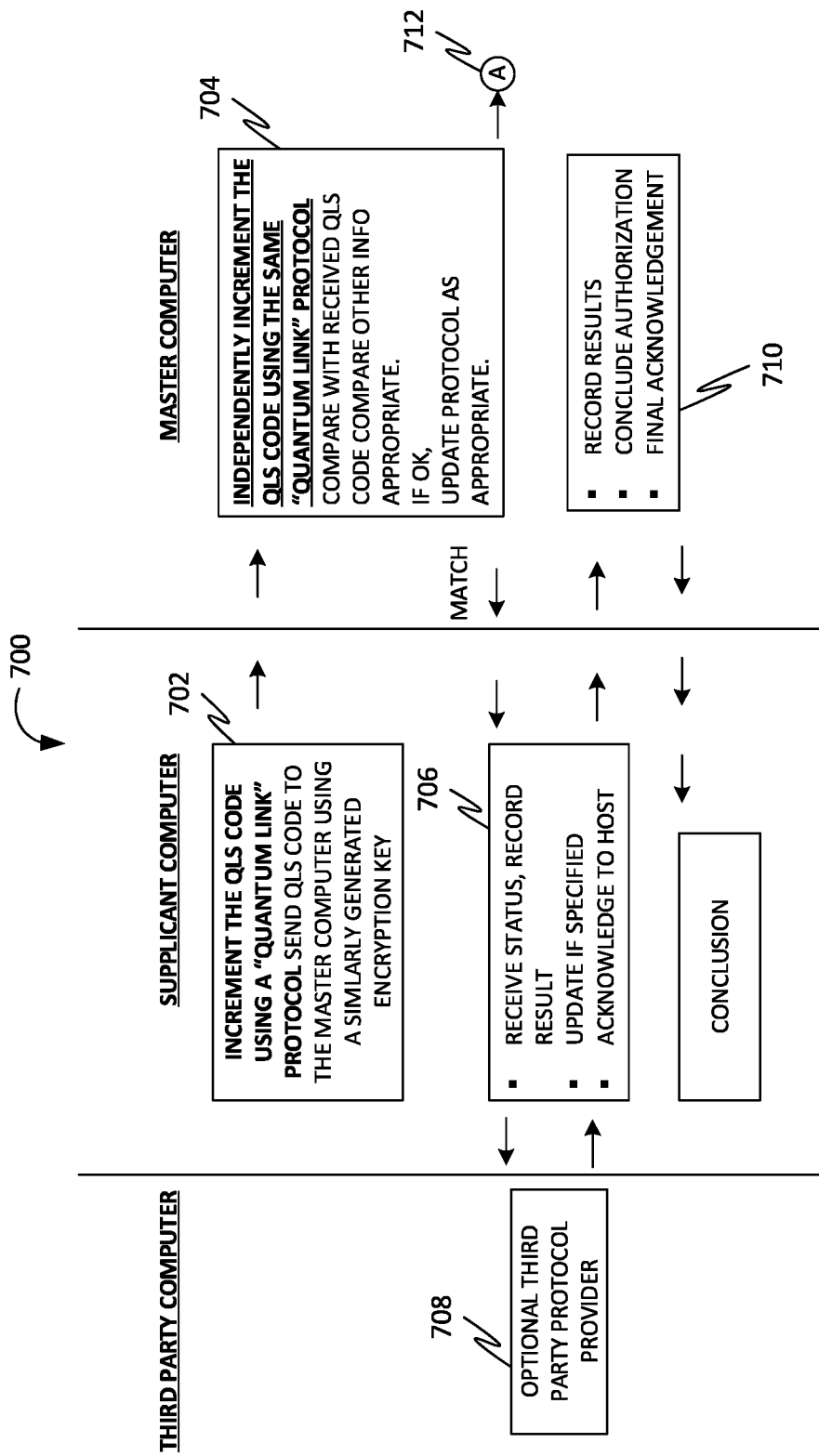
FIG. 7 illustrates a first half of a flow diagram of a method to facilitate a two-party transaction between a supplicant computer and a master computer, in accordance with some embodiments.

FIG. 7 illustrate a first half of a flow diagram of a method 700 to facilitate a two-party transaction between a supplicant computer and a master computer, in accordance with some embodiment. Accordingly, the two-party transaction, in an instance, may be a communication and/or a connection between computer devices and/or servers to exchange information between each other. For instance, the two-party transaction may include a user that may be using the supplicant computer for logging into a website provided by a server (such as the master computer). Accordingly, the method may include a step 702 of incrementing the QLS code using a quantum link protocol. Further, the supplicant computer, in an instance, may be an IoT based computer and/or a device that may be configured to generate and/or update the QLS code using quantum link protocols. Further, the supplicant computer, in an instance, may include, but not limited to, a smartphone, a pc, a laptop, a quantum computer etc. Further, the quantum link protocols, in an instance, may include functions and/or parameters that may be configured to generate new and/or unique QLS code each time when any transaction may occur between the supplicant computer and the master computer. Further, the quantum link protocols, in an instance, may be unique for each set of computers. Further, the quantum link protocols, in an instance, may be configured to be changed with time in an unpredictable manner that may limit a practicality of discerning a pattern (by an unauthorized computer device) by keeping a history of prior QLS code. Further, the quantum link protocols, in an instance, may or may not be updated in any given transaction, and/or may no longer be valid. Further, even if the quantum link protocols, in an instance, may be intercepted and/or compromised, then the quantum link protocol may be of no value for the future transactions. Further, the quantum link protocol, in an instance, may not be required to be updated in every transaction.

Further, the method may include a step 704 of independently incrementing the QLS code by the master computer using the same quantum link protocol. Further, the master computer, in an instance, may be configured to compare an independently generated QLS code with the QLS code received from the supplicant computer. Further, the master computer, in an instance, may also be configured to compare other information as appropriate. Further, the master computer, in an instance, may update protocols based on comparing. Accordingly, the master computer, in an instance, may be configured to compare the QLS code generated by the supplicant computer with the independent QLS code generated by the master computer in order to determine if the transaction between the supplicant computer and the master computer may be allowed or not. Further, the supplicant computer, in an instance, may receive status and/or record results from the master computer if, and only if, the QLS code (from the supplicant computer) and the independent QLS code (from the master computer) may be recognized to be same by the master computer based on the comparing.

At 702, the method 700 may include incrementing the QLS code using a "quantum link" protocol send QLS code to the master computer using a similarly generated encryption key.

At 704, the method 700 may include independently incrementing the QLS code using the same "quantum link" protocol, comparing with received QLS code and comparing other information appropriate. If ok, update protocol as appropriate.

At 706, the method 700 may include receiving status, recording result, updating if specified and acknowledge to host.

At 708, the method 700 may include optionally using a third party protocol provider.

At 710, the method 700 may include recording results, concluding authorization and sending final acknowledgement.

Figure 8:
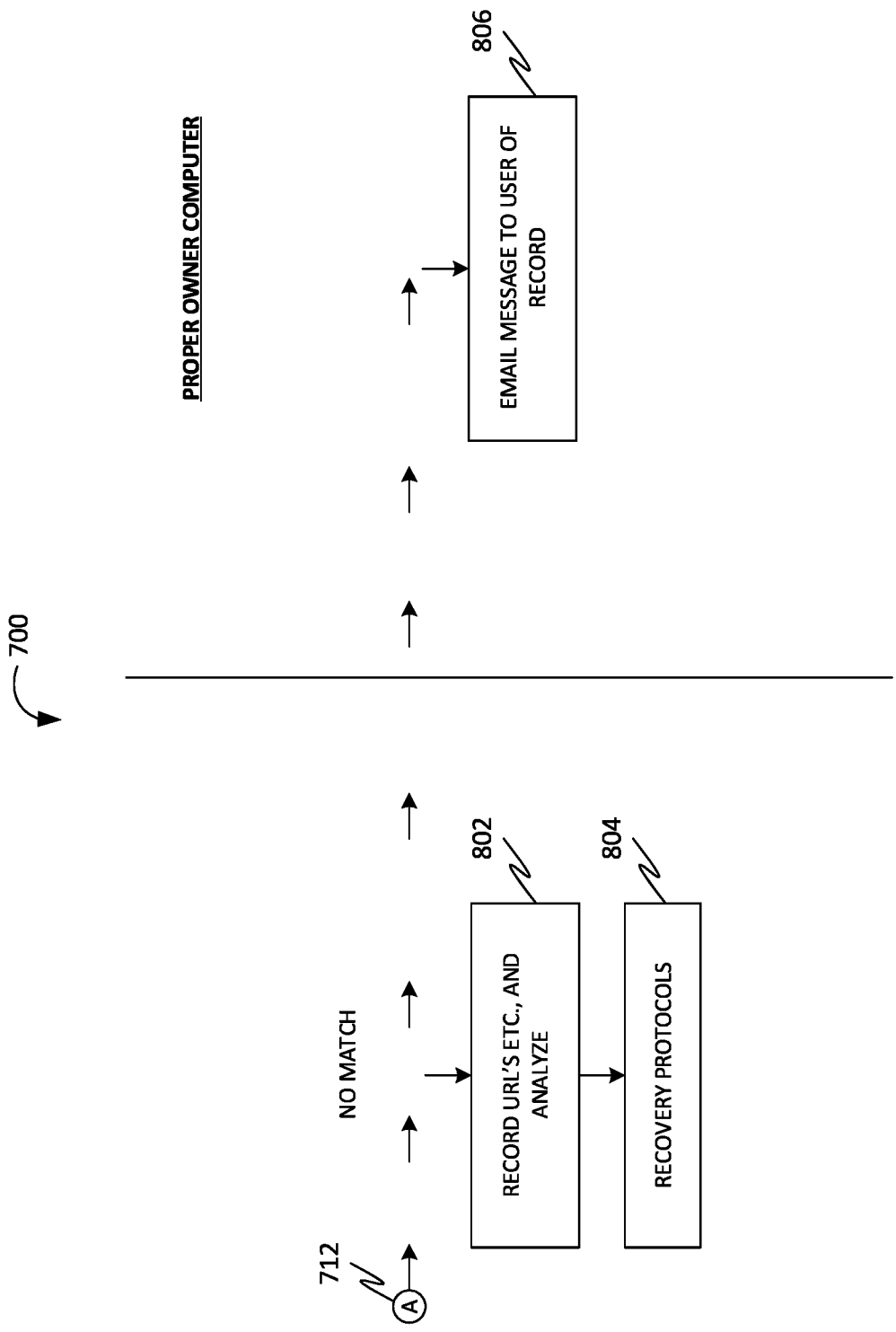
FIG. 8 illustrates a second half of the flow diagram of the method to facilitate the two-party transaction between the supplicant computer and the master computer, in accordance with some embodiments.

FIG. 8 illustrates a second half of the flow diagram of the method 700 to facilitate the two-party transaction between the supplicant computer and the master computer, in accordance with some embodiment. Further, an unauthorized computer and/or device, in an instance, may not know the correct quantum link protocols that may be necessary to generate a valid QLS code. Further, the unauthorized computer and/or device, in an instance, may be any device that may be used by an unauthorized user (such as a hacker) for hacking and/or phishing purposes. Further, the unauthorized computer and/or device, in an instance, may not provide the valid QLS code as the probability of guessing the QLS code may be as low as 1/11580000000 . . . (with 74 zeros). Further, the probability of guessing the QLS code, in an instance, may be reduced exponentially in a case where a multiple QLS code may be required from the supplicant computer and/or the master computer. Further, an improper access attempt by the unauthorized computer and/or device, in an instance, may result in a notification to a real account owner (such as a proper owner computer), and/or proper authorities. Further, the master computer, in an instance, may be configured to transmit the notification to alert the real account owner about the improper access attempt. The notification, in an instance, may include one or more information (such as an email message that may include, but not limited to, a URL, an IP address etc.) associated with the unauthorized computer and/or device that may have attempted the improper access. Further, the unauthorized computer and/or device, in an instance, may not be given any notice for denied access.

At 802, the method 700 may include recording URL's etc., and analyzing.

At 804, the method 700 may include initiating recovery protocols.

At 806, the mothed 700 may include sending email message to user of record.

Figure 9:
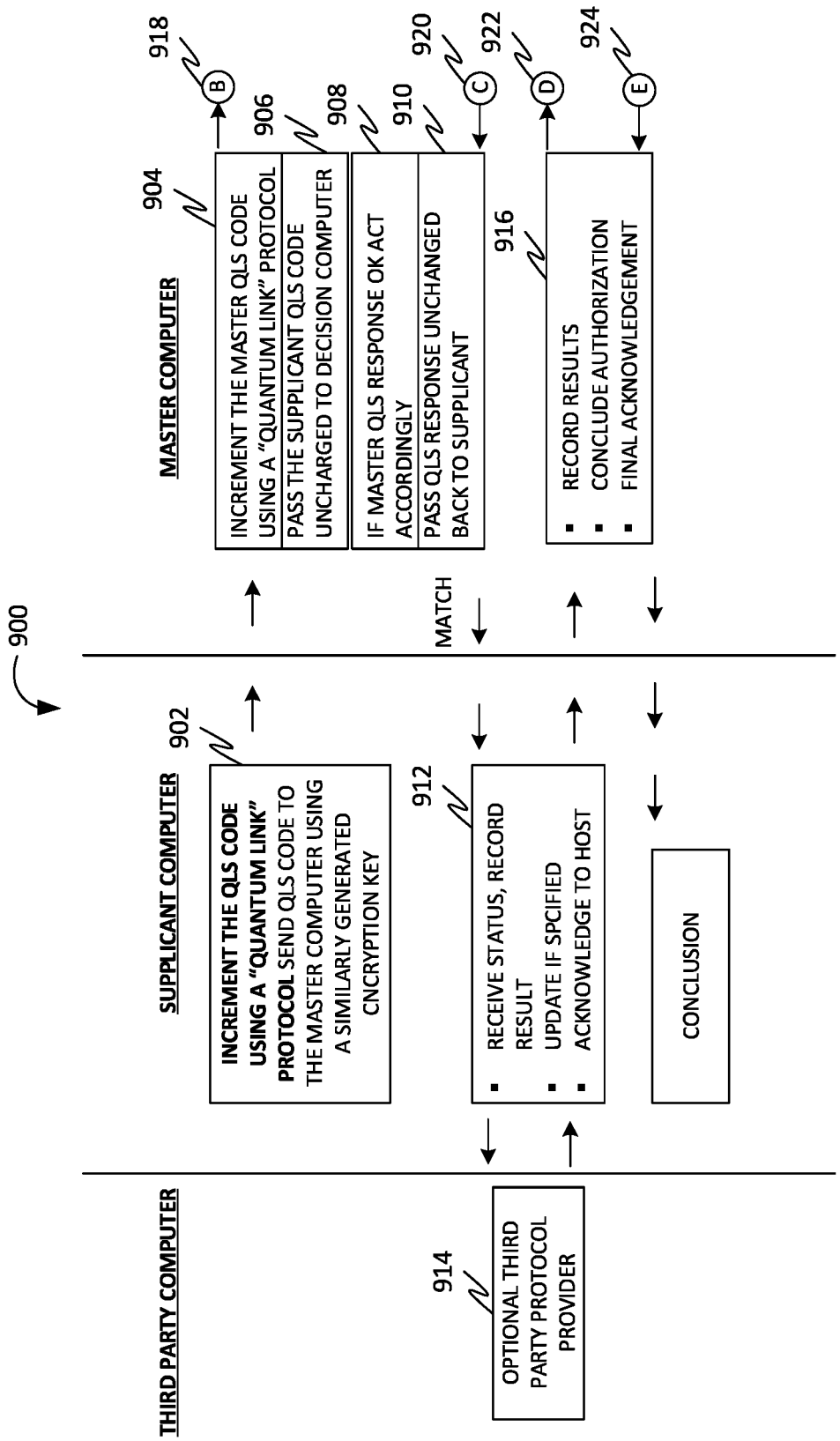
FIG. 9 illustrates a first half of a flow diagram of a method to facilitate a three-party transaction between a supplicant computer, a master computer, and/or a decision computer, in accordance with some embodiments.

FIG. 9 illustrates a first half of a flow diagram of a method 900 to facilitate a three-party transaction between a supplicant computer, a master computer, and/or a decision computer, in accordance with some embodiment. Accordingly, the three-party transaction, in an instance, may be a communication and/or a connection between computer devices and/or servers to exchange information between each other. For instance, the three-party transaction may include a user that may be using the supplicant computer for opening a new credit card account provided by a server (such as the master computer) and/or approved by the decision computer. Further, the supplicant computer, in an instance, may be an IoT based computer and/or a device that may be configured to generate and/or update the QLS code using quantum link protocols. Further, the supplicant computer, in an instance, may include, but not limited to, a smartphone, a pc, a laptop, a quantum computer etc. Further, the quantum link protocols, in an instance, may include functions and/or parameters that may be configured to generate new and/or unique QLS code each time when the three-party transaction may occur. Further, the quantum link protocols, in an instance, may be unique for each set of computers. Further, the quantum link protocols, in an instance, may be configured to be changed with time in an unpredictable manner that may limit a practicality of discerning a pattern (by an unauthorized computer device) by keeping a history of prior QLS code. Further, the quantum link protocols, in an instance, may or may not be updated in any given transaction, and/or may no longer be valid. Further, even if the quantum link protocols, in an instance, may be intercepted and/or compromised, then the quantum link protocol may be of no value for the future transactions. Further, the quantum link protocol, in some embodiments, may not be required to be updated in every transaction.

At 902, the method 900 may include incrementing the QLS code using a "quantum link" protocol send QLS code to the master computer using a similarly generated encryption key.

At 904, the method 900 may include incrementing the master QLS code using a "quantum link" protocol.

At 906, the method 900 may include passing the supplicant QLS code uncharged to decision computer.

At 908, the method 900 may include acting accordingly, if master QLS response is ok.

At 910, the method 900 may include passing QLS response unchanged back to supplicant.

At 912, the method 900 may include receiving status, recording result, updating if specified and send acknowledgment to host.

At 914, the method 900 may include optionally using a third party protocol provider.

At 916, the method 900 may include recording results, concluding authorization and sending final acknowledgement.

Figure 10:
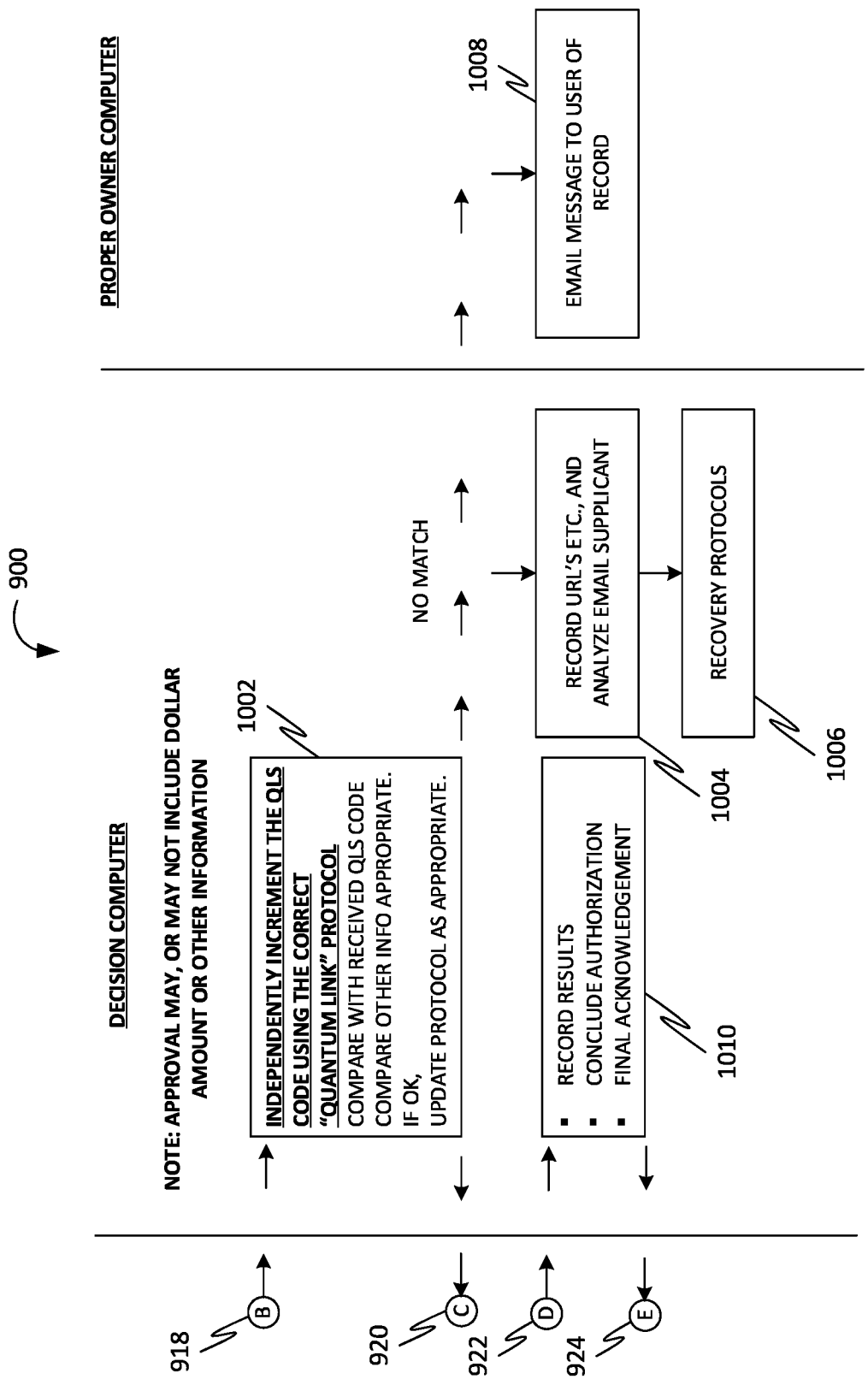
FIG. 10 illustrates a second half of the flow diagram of the method to facilitate the three-party transaction between the supplicant computer, the master computer, and/or the decision computer, in accordance with some embodiments.

FIG. 10 illustrates a second half of the flow diagram of the method 900 to facilitate the three-party transaction between the supplicant computer, the master computer, and/or the decision computer, in accordance with some embodiment. Further, the master computer, in an instance, may increment a master QLS code using the quantum link protocol. Further, the master computer, in an instance, may pass the QLS code (from the supplicant computer) unchanged to the decision computer. Further, the decision computer, in an instance, may independently increment the QSL codes using the correct quantum link protocol and/or may be configured to compare the QLS code with the QLS code received from the master computer. Further, the decision computer, in an instance, may also compare other information as appropriate. Further, the decision computer, in an instance, may update protocols based on the comparing. Further, the master computer, in an instance, may act accordingly if the master QLS response OK. Further, the master computer, in an instance, may pass QLS response unchanged back to the supplicant computer. Further, the supplicant computer, in an instance, may receive status, record results, and/or may acknowledge to host. Further, the master computer, in an instance, may record results and/or may conclude authorization along with a final acknowledgment. Further, the decision computer, in an instance, may record results and/or may conclude authorization along with the final acknowledgment.

Further, an unauthorized computer and/or device, in an instance, may not know the correct quantum link protocols that may be necessary to generate a valid QLS code. Further, the unauthorized computer and/or device, in an instance, may be any device that may be used by an unauthorized user (such as a hacker) for hacking and/or phishing purposes. Further, the unauthorized computer and/or device, in an instance, may not provide the valid QLS code as the probability of guessing the QLS code may be as low as 1/11580000000 . . . (with 74 zeros). Further, the probability of guessing the QLS code, in an instance, may be reduced exponentially in a case where a multiple QLS code may be required from the supplicant computer and/or the master computer. Further, an improper access attempt by the unauthorized computer and/or device, in an instance, may result in a notification to a real account owner (such as a proper owner computer), and/or proper authorities. Further, the master computer, in an instance, may be configured to transmit the notification to alert the real account owner about the improper access attempt. The notification, in an instance, may include one or more information (such as an email message that may include, but not limited to, a URL, an IP address etc.) associated with the unauthorized computer and/or device that may have attempted the improper access. Further, the unauthorized computer and/or device, in an instance, may not be given any notice for denied access.

At 1002, the method 900 may include independently incrementing the QLS code using the correct "quantum link" protocol comparing with received QLS code comparing other information appropriate. If ok, update protocol as appropriate.

At 1004, the method 900 may include recording URL's etc., and analyzing email supplicant.

At 1006, the method 900 may include initiating recovery protocols.

At 1008, the method 900 may include sending email message to user of record.

At 1010, the method 900 may include recording results, conclude authorization and final acknowledgement.

Figure 11:
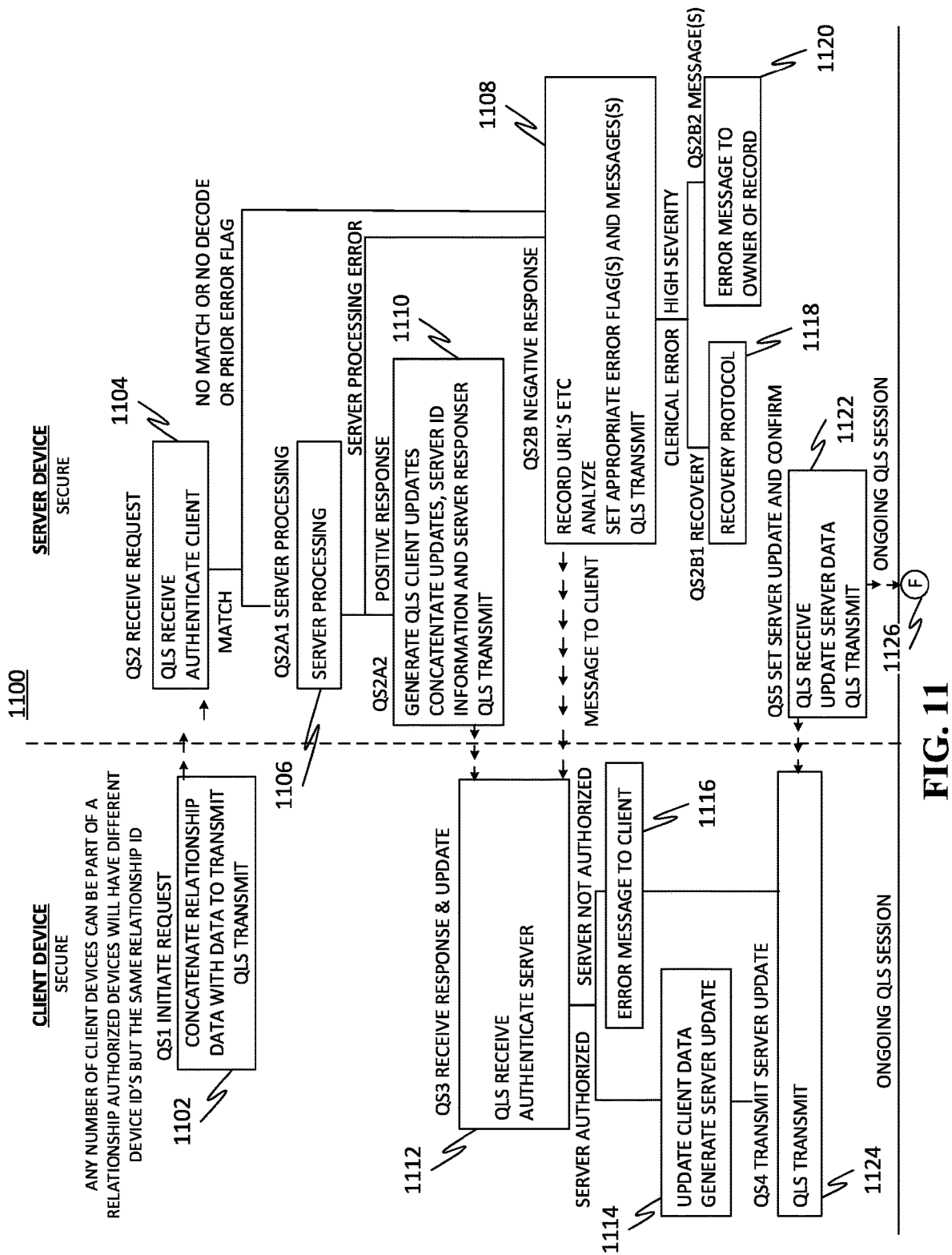
FIG. 11 is a first half of a flow diagram of a method for operating Quantum Level Security QLS "secure devices," in accordance with some embodiments.

FIG. 11 is a first half of a flow diagram for a method 1100 for operating Quantum Level Security QLS "secure devices," in accordance with some embodiments. Accordingly, the secure device, in an instance, may be allow access only through QLS or an equivalent secure access protocol. Further, "QLS transmit" may mean that the device chooses at random, a previously provided function and uses the function to generate an encryption key. Further, the device may then encrypt information that may need to be transmitted. Further, the device, in an instance, may append any required headers and QLS enabling information before transmitting. Further, the device may wipe the encryption key and may delete the encryption key from memory. Further, "QLS Receive" may mean that the device receives the transmission and parse the enabling information. Further, the device may use a specified function to generate an encryption key. Further, the device may decode the information received. Further, the device may wipe the encryption key and may free the memory. Further, the "QLS Authentication" may confirm the identity and authorization of both client and server. Further, the QLS may determine access privileges and limit QLS activities accordingly. Further, the QLS may post privilege information for system/program use. However, QLS may not implement changes to relate programs and operating systems to implement those restrictions.

At 1102, the method 1100 may include concatenating relationship data with data to transmit QLS transmit.

At 1104, the method 1100 may include receiving request at QLS receive authenticate client.

If a match is found, then at 1106, the method 1100 may include performing server processing.

If no match or no decode or prior error flag is found, then at 1108, the method 1100 may include recording URL'S etc., analyzing, setting appropriate error flag(s) and messages(s) and transmitting QLS.

At 1110, the method 1100 may include generating QLS client updates, concatenating updates, server ID information and server responser and transmitting QLS.

At 1112, the method 1100 may include receiving QLS and authenticate server.

If a server is authorized, then at 1114, the method 1100 may include updating client data and generating server update.

If server is not authorized, then at 1116, the method 1100 may include sending error message to client.

If a clerical error is found, then at 1118, the method 1100 may include protocol recovering.

If high severity is detected, then at 1120, the method 1100 may include sending error message to owner of record.

At 1122, the method 1100 may include receiving QLS, updating server data and transmitting QLS.

At 1124, the method 1100 may include transmitting QLS.

Figure 12:
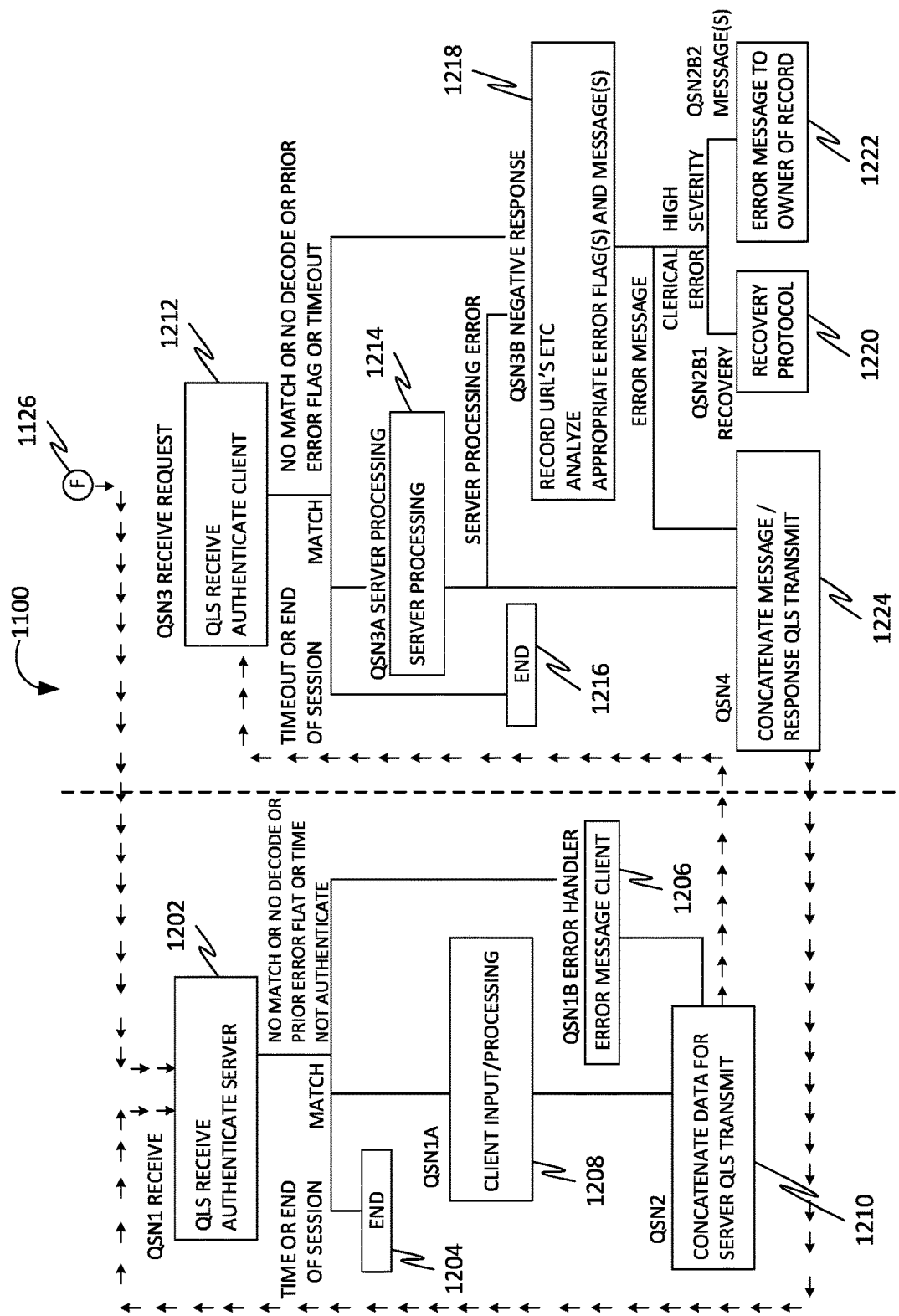
FIG. 12 is a second half of the flow diagram a method for operating Quantum Level Security QLS "secure devices," in accordance with some embodiments.

FIG. 12 is a second half of the flow diagram for the method 1100 for operating Quantum Level Security QLS "secure devices," in accordance with some embodiments.

At 1202, the method 1100 may include receiving response and authenticate server.

If a match is found, then at 1204, the method 1100 may include performing end.

If no match or no decode or prior error flag or time is found, then at 1206, the method 1100 may include sending error message to client.

At 1208, the method 1100 may include client input/processing.

At 1210, the method 1100 may include concatenating data for server QLS transmit.

At 1212, the method 1100 may include receiving request at QLS receive authenticate client.

If a match is found, then at 1214, the method 1100 may include performing server processing.

If timeout or end of session is detected, then at 1216, the method 1100 may include proceeding to an end.

If no match or no decode or prior error flag or time out is found, then at 1218, the method 1100 may include recording URL'S etc., analyzing, setting appropriate error flag(s) and messages(s).

If clerical error is found, then at 1220, the method 1100 may include recovering protocol.

If high severity is detected, then at 1222, the method 1100 may include sending error message to owner of record.

At 1224, the method 1100 may include concatenating message/response QLS transmit.

Figure 13:
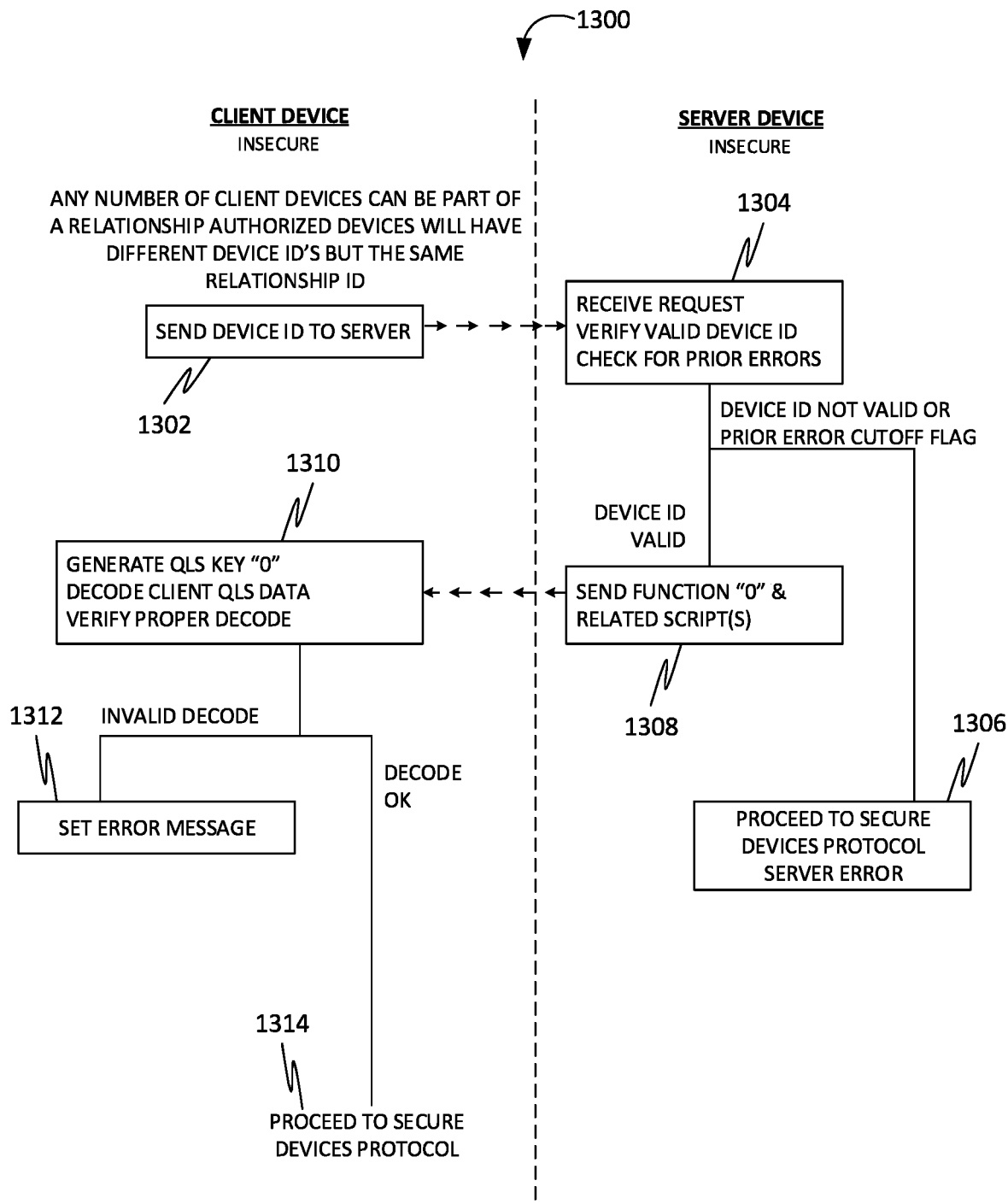
FIG. 13 is a flow diagram a method for operating Quantum Level Security QLS "insecure devices" using function "0," in accordance with some embodiments.

FIG. 13 is a flow diagram of a method 1300 for operating Quantum Level Security QLS "insecure devices" using function "0," in accordance with some embodiments.

Accordingly, the insecure device, in an instance, may allow unrelated access to device without QLS. Further, the QLS data, scripts, and functions, in an instance, may be encrypted on the insecure devices. Further, the function "0," in an instance, may be a special function that may be unique to each device. Further, the function "0," in an instance, may allow an insecure client (that may be using the insecure device) to access (decode) QLS information after preliminary identity (ID) verification.

At 1302, the method 1300 may include sending device ID to server.

At 1304, the method 1300 may include receiving request, verifying valid device ID and checking for prior error.

At 1306, the method 1300 may include proceeding to secure devices protocol server error.

At 1308, the method 1300 may include sending function "0" and related script(s).

At 1310, the method 1300 may include generating QLS key "0", decoding client QLS data and Verifying proper decode.

If invalid decode is detected, then at 1312, the method 1300 may include setting error message.

If decode is ok, then at 1314, the method 1300 may include proceeding to secure devices protocol.

Figure 14:
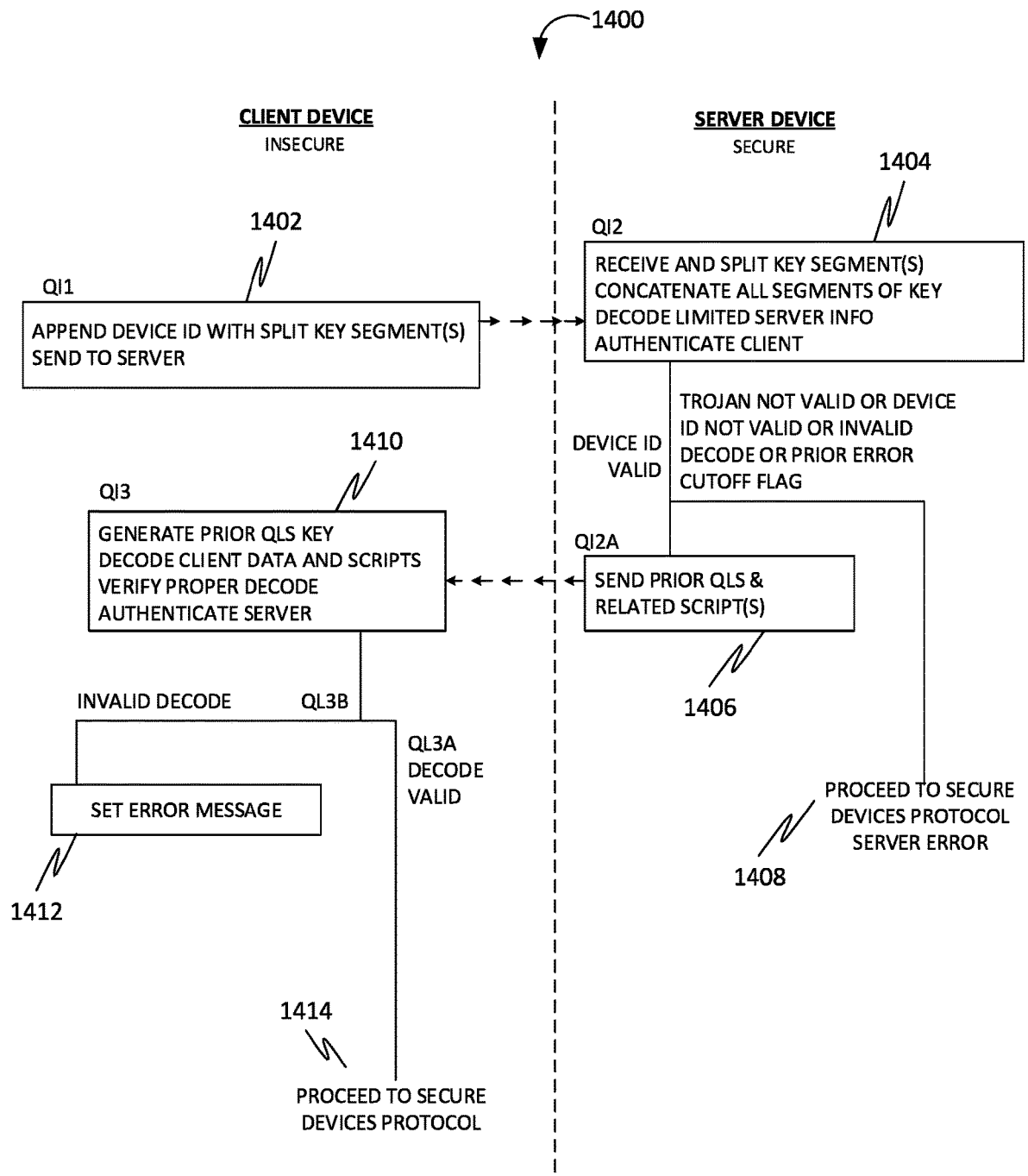
FIG. 14 is a flow diagram a method for operating Quantum Level Security QLS "insecure devices" using split key, in accordance with some embodiments.

FIG. 14 is a flow diagram of a method 1400 for operating Quantum Level Security QLS "insecure devices" using split key, in accordance with some embodiments. Accordingly, the insecure device, in an instance, may allow unrelated access to device without QLS. Further, the QLS data, scripts, and functions, in an instance, may be encrypted on the insecure devices. Further, the split key, in an instance, may be an encryption key that may provide access to QLS information. Further, the split key, in an instance, may be split into two or more parts and each part may be retained on different devices. Further, two intended devices, in an instance, may put the two split keys together to enable access to the QLS information.

At 1402, the method 1400 may include appending device ID with split key segment(s) send to server.

At 1404, the method 1400 may include receiving and split key segment(s), concatenating all segments of key, decoding limited server information and authenticating client.

At 1406, the method 1400 may include sending prior QLS & related script(s).

At 1408, the method 1400 may include proceeding to secure devices protocol server error.

At 1410, the method 1400 may include generating prior QLS key, Decoding client data and scripts, verifying proper decode and authenticating server.

If invalid decode is detected, then at 1412, the method 1400 may include setting error message.

If decode valid is detected, then at 1414, the method 1400 may include proceeding to secure devices protocol.

Figure 15:
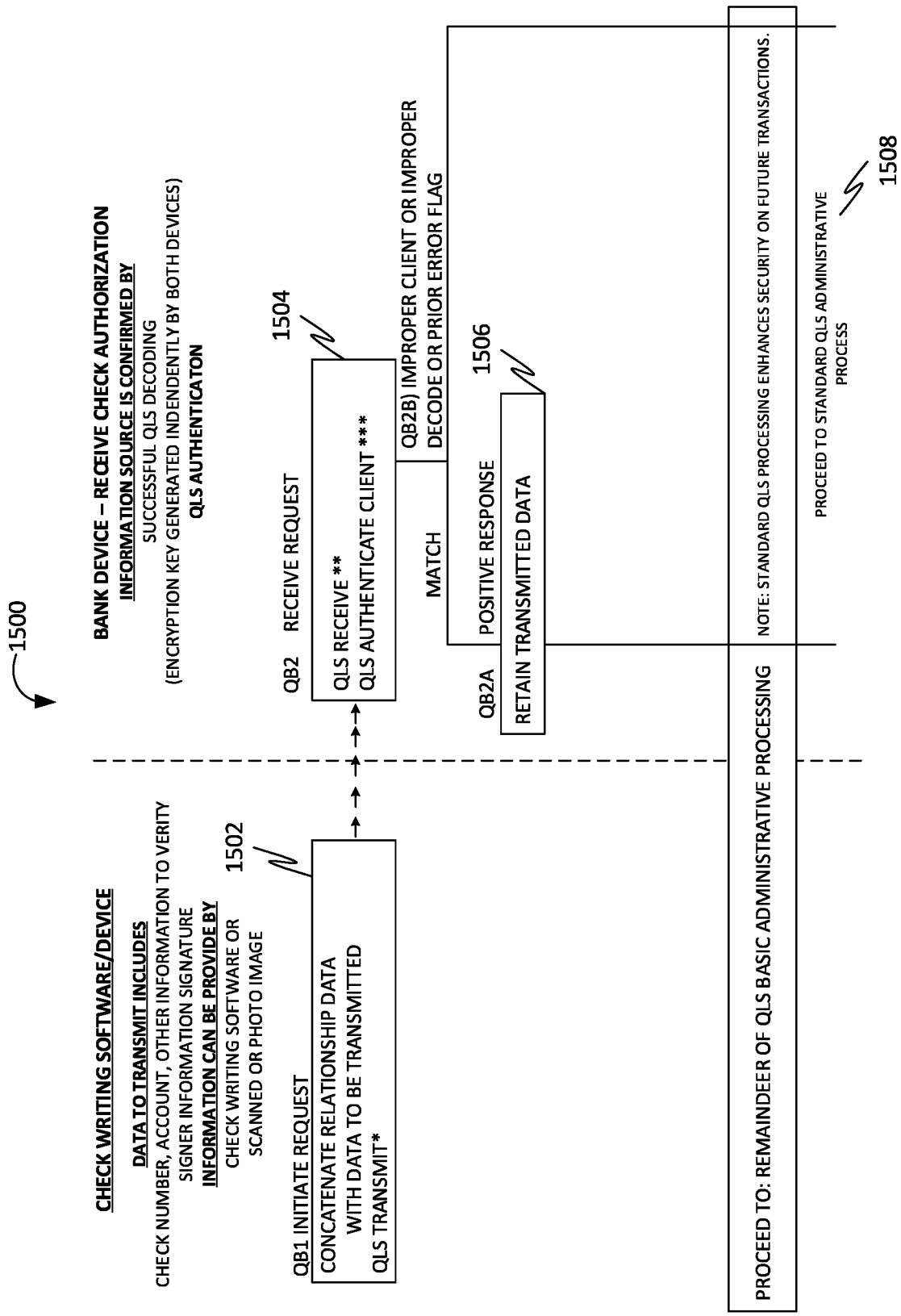
FIG. 15 is a first half of a flow diagram for Quantum Level Security QLS "Basic" application for three party security, in accordance with some embodiments.

FIG. 15 is a first half of a flowchart of method 1500 for operating Quantum Level Security QLS "Basic" application for three party security, in accordance with some embodiments. Accordingly, three parties may include a check writing device, a bank device to receive check authorization, and a bank device to verify authorization on receipt of check (as shown in FIG. 13). Further, "QLS transmit" may mean that the device chooses at random, a previously provided function and uses the function to generate an encryption key. Further, the device may then encrypt information that may need to be transmitted. Further, the device, in an instance, may append any required headers and QLS enabling information before transmitting. Further, the device may wipe the encryption key and may delete the encryption key from memory. Further, "QLS Receive" may mean that the device receives the transmission and parse the enabling information. Further, the device may use a specified function to generate an encryption key. Further, the device may decode the information received. Further, the device may wipe the encryption key and may free the memory. Further, the "QLS Authentication" may confirm the identity and authorization of both client and server. Further, the QLS may determine access privileges and limit QLS activities accordingly. Further, the QLS may post privilege information for system/program use. However, QLS may not implement changes to relate programs and operating systems to implement those restrictions.

At 1502, the method 1500 may include concatenating relationship data, with data to be transmitting and transmitting QLS.

At 1504, the method 1500 may include receiving QLS and QLS authenticate client.

If a match is found, then at 1506, the method 1500 may include retaining transmitted data.

If improper client or improper decode or prior error flag is found, then at 1508, the method 1500 may include proceeding to standard QLS administrative process.

Figure 16:
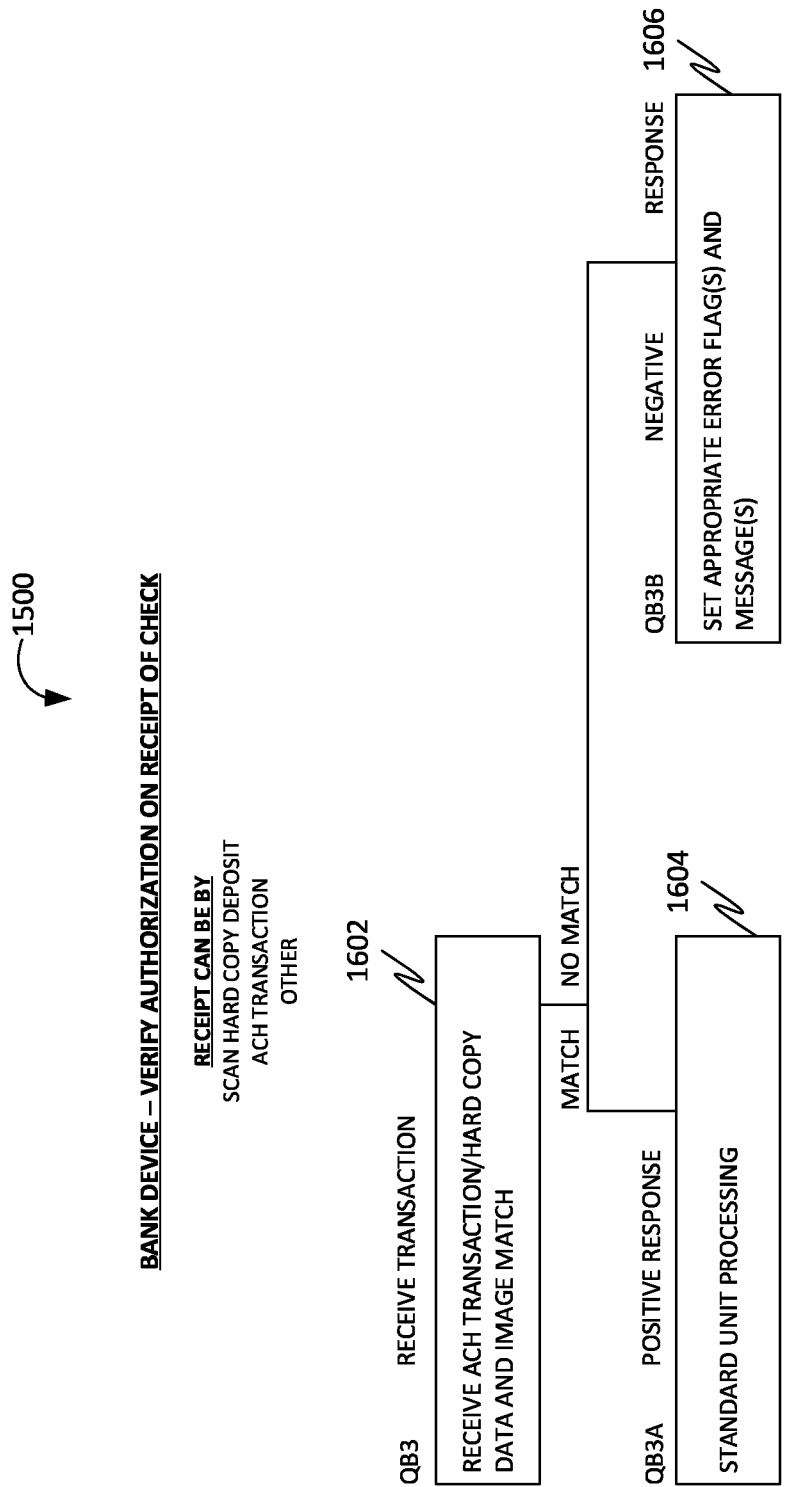
FIG. 16 is a second half of the flow diagram for Quantum Level Security QLS "Basic" application for three party security, in accordance with some embodiments.

FIG. 16 is a second half of the flow diagram of a method 1500 for operating Quantum Level Security QLS "Basic" application for three party security, in accordance with some embodiments.

At 1602, the method 1500 may include receiving ach transaction/hard copy, data and image match.

If a match is found, then at 1604, the method 1500 may include standard unit processing.

If no match is found, then at 1606, the method 1500 may include setting appropriate error flag(s) and message(s).

Figure 17:
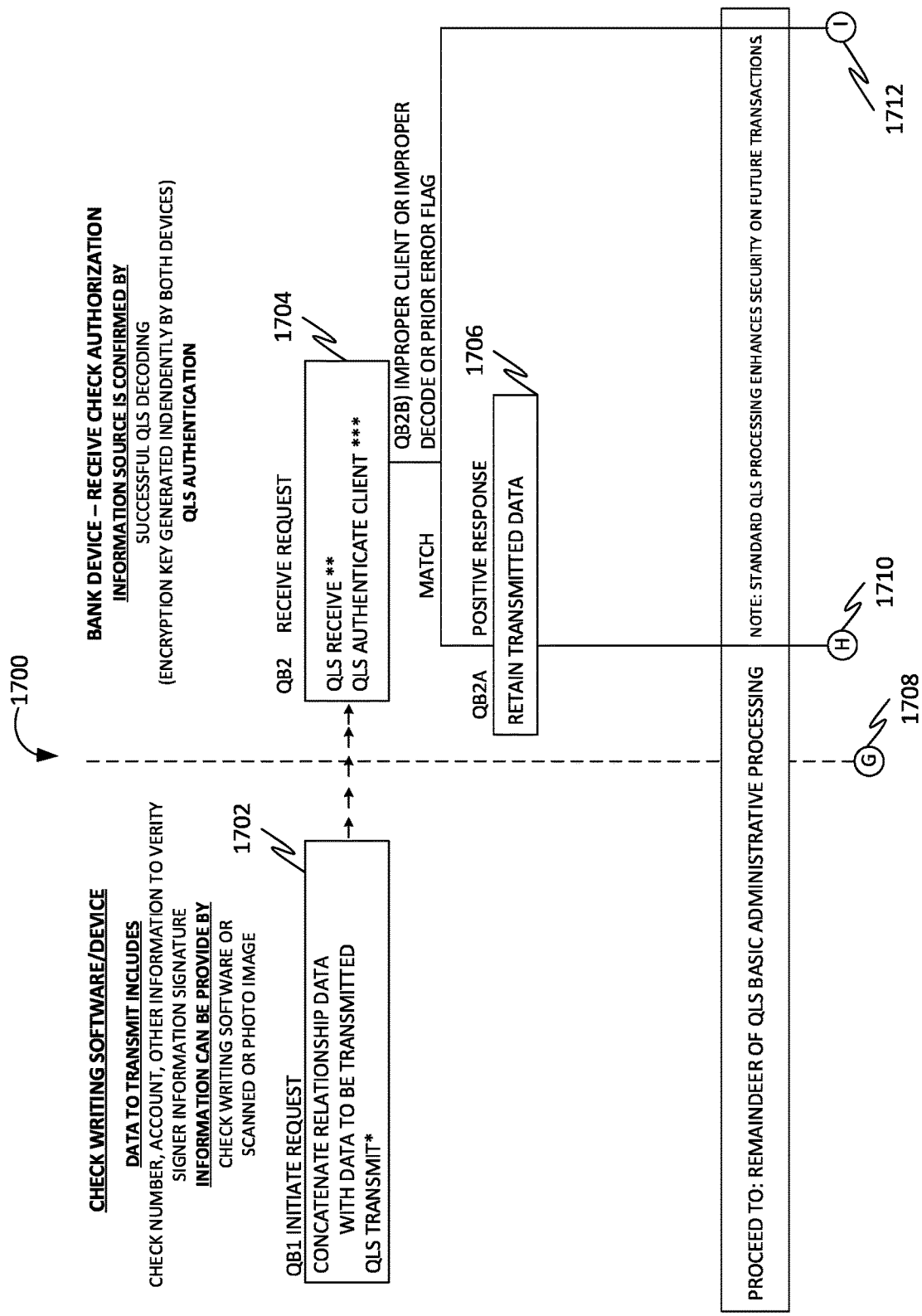
FIG. 17 is an exemplary flow diagram for Quantum Level Security QLS "Basic" application for three party security, in accordance with some exemplary embodiment.

FIG. 17 is a first part of an exemplary flow diagram of a method 1700 for Quantum Level Security QLS "Basic" application for three party security, in accordance with some exemplary embodiment.

At 1702, the method 1700 may include concatenating relationship data, with data to be transmitted and transmitting QLS.

At 1704, the method 1700 may include receiving QLS and QLS authenticate client.

If a match is found, then at 1706, the method 1700 may include retaining transmitted data.

Figure 18:
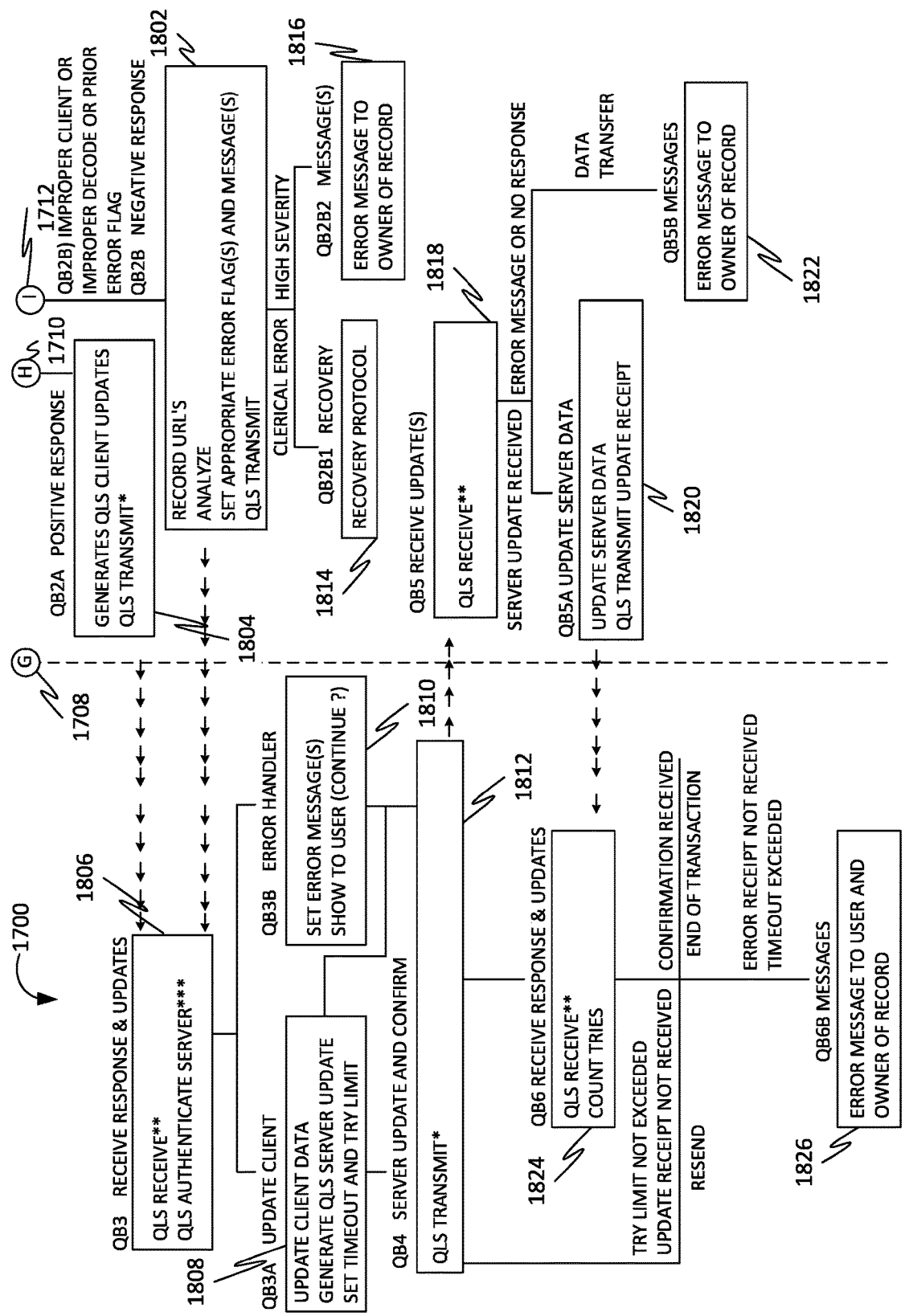
FIG. 18 is a continuation of the exemplary flow diagram for Quantum Level Security QLS "Basic" application for three party security, in accordance with some exemplary embodiment.

FIG. 18 is a second part of the exemplary flow diagram of the method 1700 for Quantum Level Security QLS "Basic" application for three party security, in accordance with some exemplary embodiment.

If improper client or improper decode or prior error flag is found, then at 1802, the method 1700 may include recording URL's, analyzing, setting appropriate error flag(s) and message(s) and transmitting QLS.

At 1804, the method 1700 may include generating QLS client updates and transmitting QLS.

At 1806, the method 1700 may include receiving QLS and QLS authenticate server.

If update client is found, then at 1808, the method 1700 may include updating client data, generating QLS server update and setting timeout and trying limit.

If error handler is found, then at 1810, the method 1700 may include setting error message(s) and showing to user (continue?).

At 1812, the method 1700 may include receiving transmitting QLS.

If clerical error is found, then at 1814, the method 1700 may include recovering protocol.

If high severity is detected, then at 1816, the method 1700 may include sending error message to owner of record.

At 1818, the method 1700 may include receiving QLS.

If server update received is found, then at 1820, the method 1700 may include updating server data and transmitting QLS update receipt.

If data transfer is found, then at 1822, the method 1700 may include sending error message to owner of record.

At 1824, the method 1700 may include receiving QLS and counting tries.

At 1826, the method 1700 may include sending error message to user and owner of record.

Figure 19:
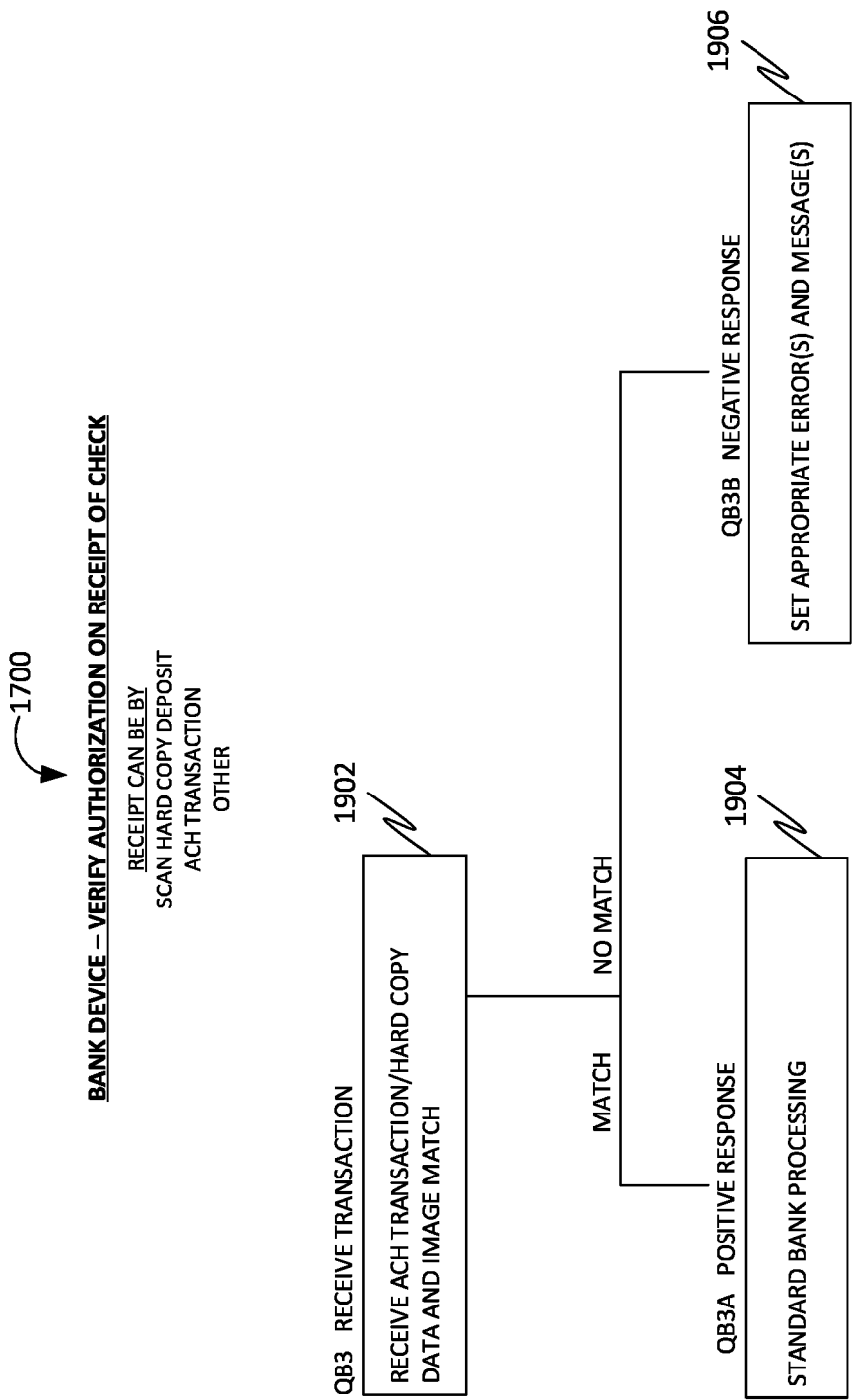
FIG. 19 is a continuation of the exemplary flow diagram for Quantum Level Security QLS "Basic" application for three party security, in accordance with some exemplary embodiment.

FIG. 19 is a third part of the exemplary flow diagram of the method 1700 for Quantum Level Security QLS "Basic" application for three party security, in accordance with some exemplary embodiment.

At 1902, the method 1700 may include receiving ach transaction/hard copy, data and image match.

If a match is found, then at 1904, the method 1700 may include perform standard bank processing.

If no match is found, then at 1906, the method 1700 may include setting appropriate error(s) and message(s).

Figure 20:
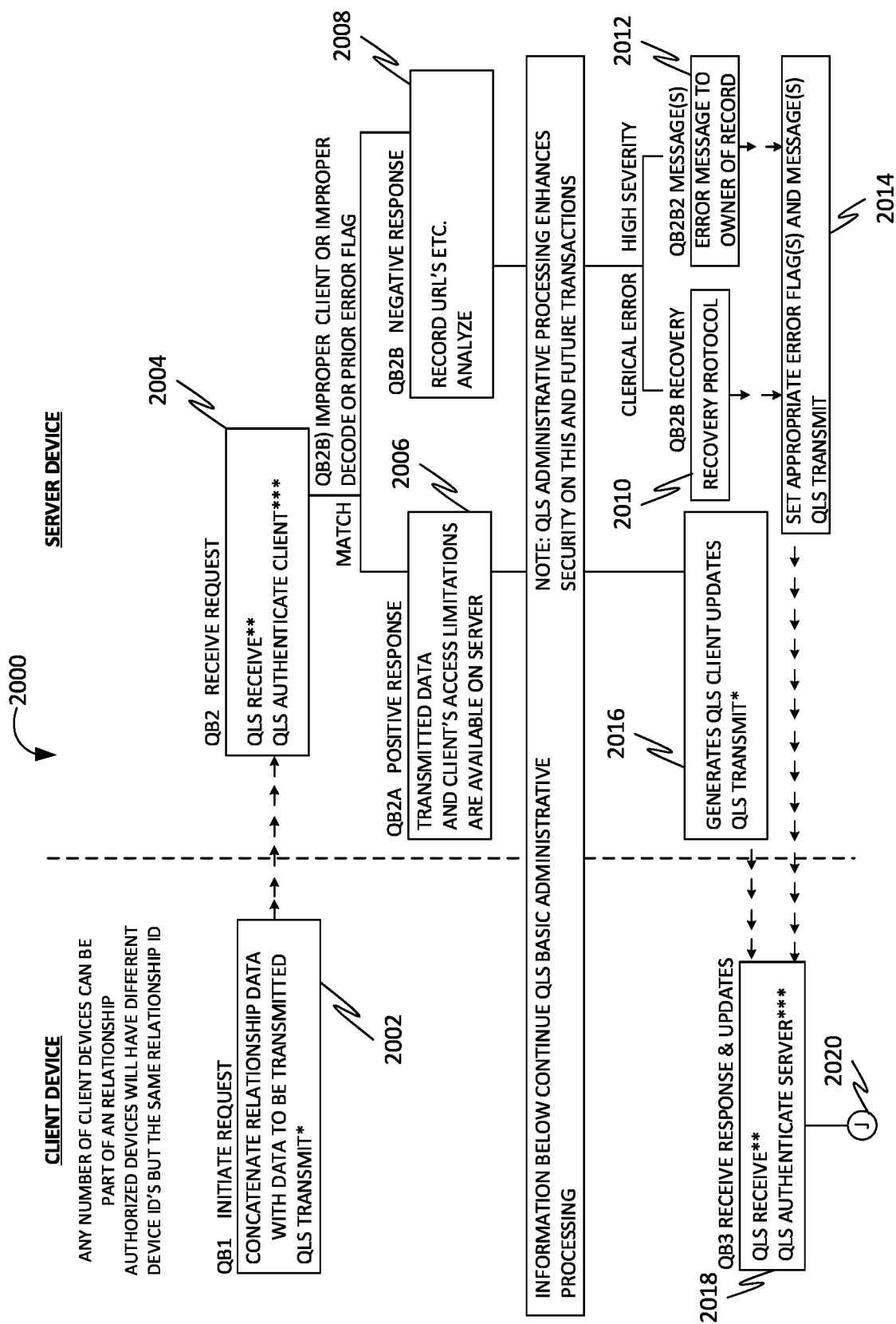
FIG. 20 is a first half of a flow diagram for Quantum Level Security (QLS) "basic" single data transfer, in accordance with some embodiments.

FIG. 20 is a first half of a flow diagram of a method 2000 for performing Quantum Level Security (QLS) "basic" single data transfer, in accordance with some embodiments. Accordingly, "QLS transmit" may mean that the device chooses at random, a previously provided function and uses the function to generate an encryption key. Further, the device may then encrypt information that may need to be transmitted. Further, the device, in an instance, may append any required headers and QLS enabling information before transmitting. Further, the device may wipe the encryption key and may delete the encryption key from memory. Further, "QLS Receive" may mean that the device receives the transmission and parse the enabling information. Further, the device may use a specified function to generate an encryption key. Further, the device may decode the information received. Further, the device may wipe the encryption key and may free the memory. Further, the "QLS Authentication" may confirm the identity and authorization of both client and server. Further, the QLS may determine access privileges and limit QLS activities accordingly. Further, the QLS may post privilege information for system/program use. However, QLS may not implement changes to relate programs and operating systems to implement those restrictions.

At 2002, the method 2000 may include concatenating relationship data, with data to be transmitted and transmitting QLS.

At 2004, the method 2000 may include receiving QLS and QLS authenticate client.

If a match is found, then at 2006, the method 2000 may include transmitting data and client's access limitations are available on server.

If improper client or improper decode or prior error flag is found, then at 2008, the method 2000 may include recording URL's etc. and analyzing.

If clerical error is found, then at 2010, the method 2000 may include recovering protocol.

If high severity is detected, then at 2012, the method 2000 may include sending error message to owner of record.

At 2014, the method 2000 may include setting appropriate error flag(s) and message(s) and transmitting QLS.

At 2016, the method 2000 may include generating QLS client updates and transmitting QLS.

At 2018, the method 2000 may include receiving QLS and QLS authenticate server.

Figure 21:
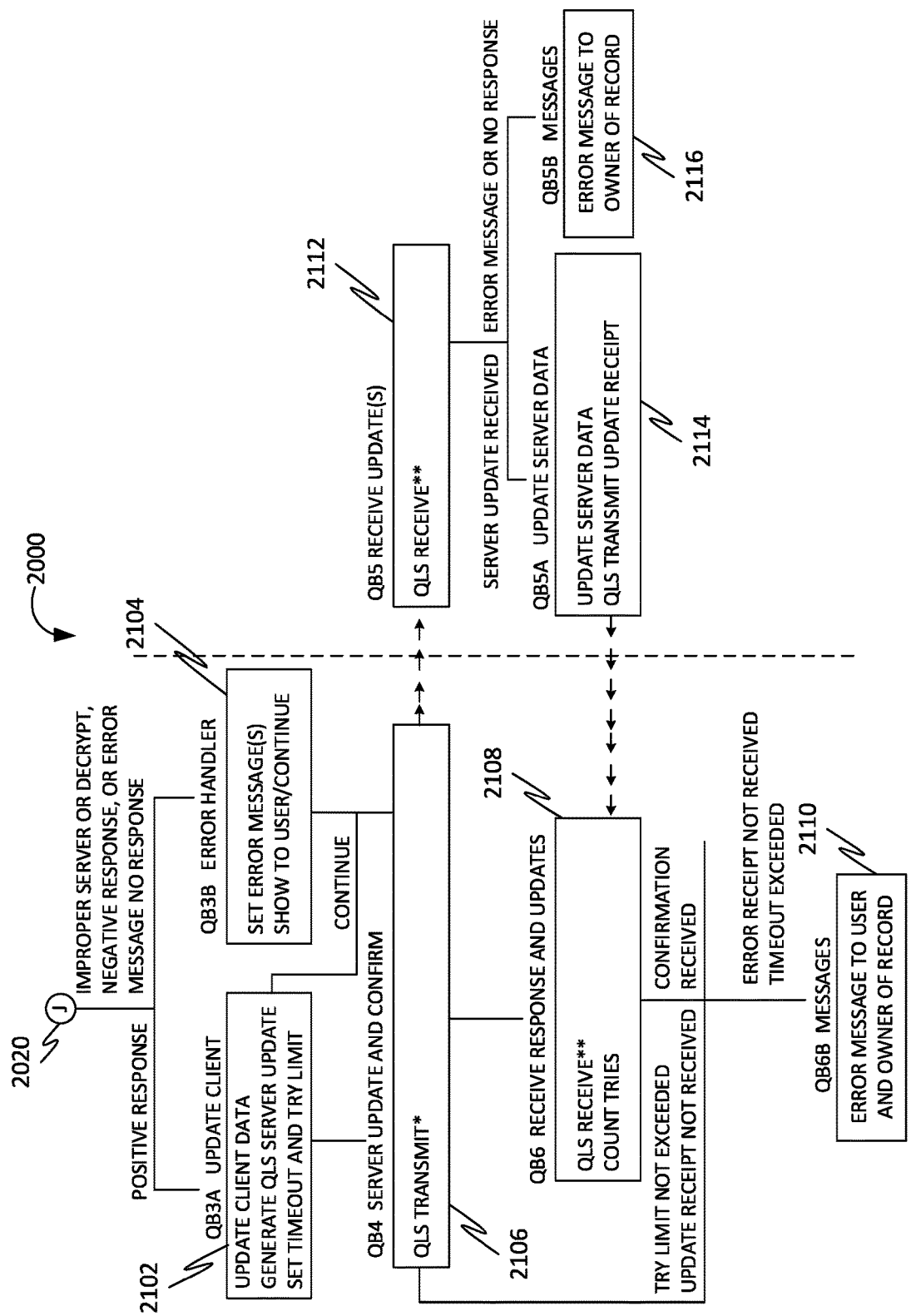
FIG. 21 is a second half of the flow diagram for Quantum Level Security (QLS) "basic" single data transfer, in accordance with some embodiments.

FIG. 21 is a second half of the flowchart of the method 2000 for performing Quantum Level Security (QLS) "basic" single data transfer, in accordance with some embodiments.

If positive response is found, then at 2102, the method 2000 may include updating client data, generating QLS server update and setting timeout and try limit.

If improper server or decrypt, negative response, or error message or no response is detected, then at 2104, the method 2000 may include setting error message(s) and showing to user/continue.

At 2106, the method 2000 may include receiving transmitting QLS.

At 2108, the method 2000 may include receiving QLS and counting tries.

At 2110, the method 2000 may include sending error message to user and owner of record.

At 2112, the method 2000 may include receiving QLS.

If server update received data is found, then at 2114, the method 2000 may include updating server data and transmitting QLS update receipt.

If error message or no response is found, then at 2116, the method 2000 may include sending error message to owner of record.

Figure 22:
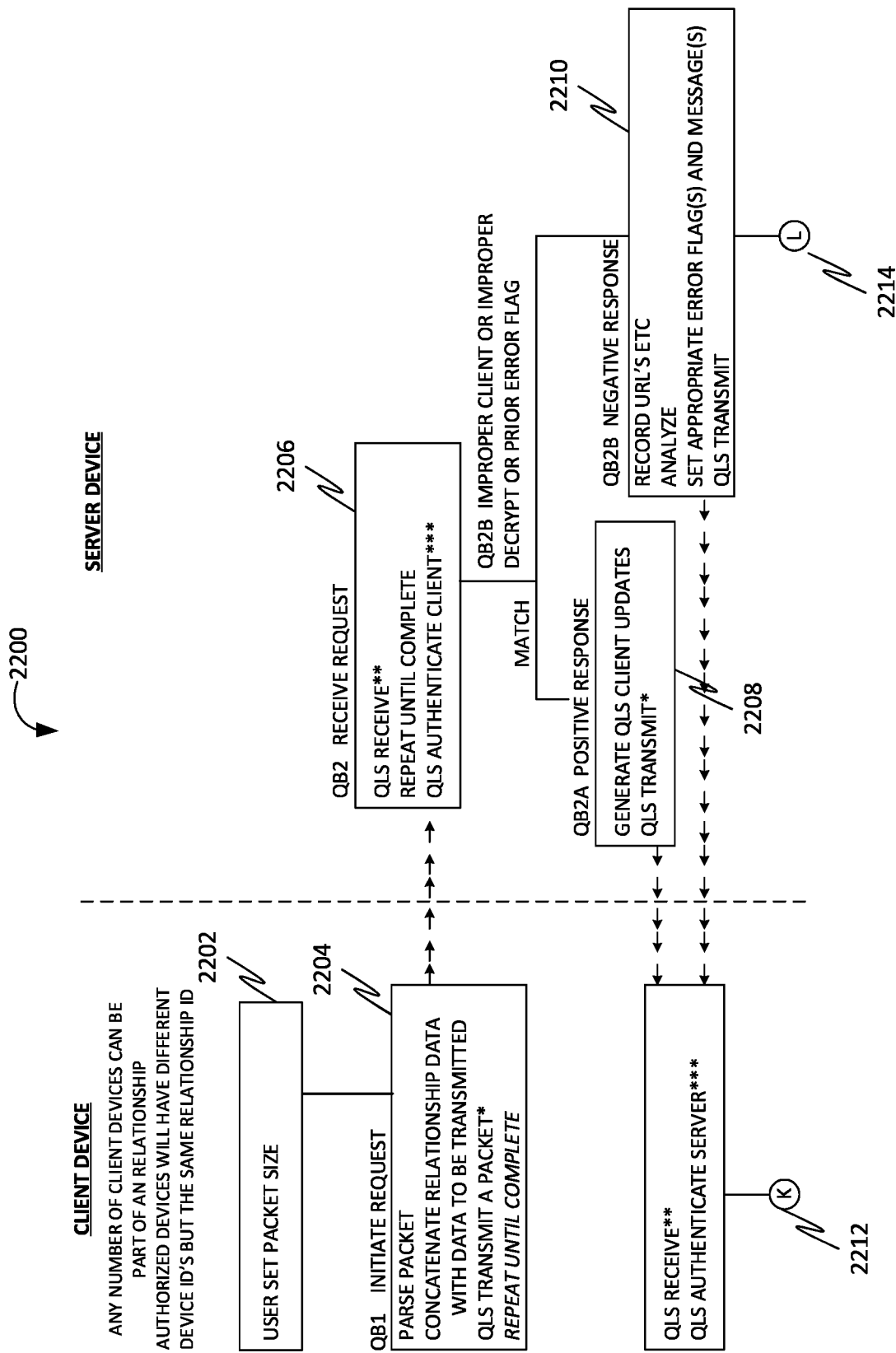
FIG. 22 is a first half of a flow diagram for Quantum Level Security QLS "basic" Packet data transfer, in accordance with some embodiments.

FIG. 22 is a first half of a flow diagram of a method 2200 for Quantum Level Security QLS "basic" Packet data transfer, in accordance with some embodiments.

At 2202, the method 2200 may include setting user packet size.

At 2204, the method 2200 may include parse packet, concatenating relationship data, with data to be transmitted, transmitting QLS a packet and Repeating until complete.

At 2206, the method 2200 may include receiving QLS, repeating until complete and authenticating QLS client.

If a match is found, then at 2208, the method 2200 may include generating QLS client updates and transmitting QLS.

If improper client or improper decrypt or prior error flag is detected, then at 2210, the method 2200 may include recording URL's etc., analyzing, setting appropriate error flag(s) and message(s) and transmitting QLS.

Figure 23:
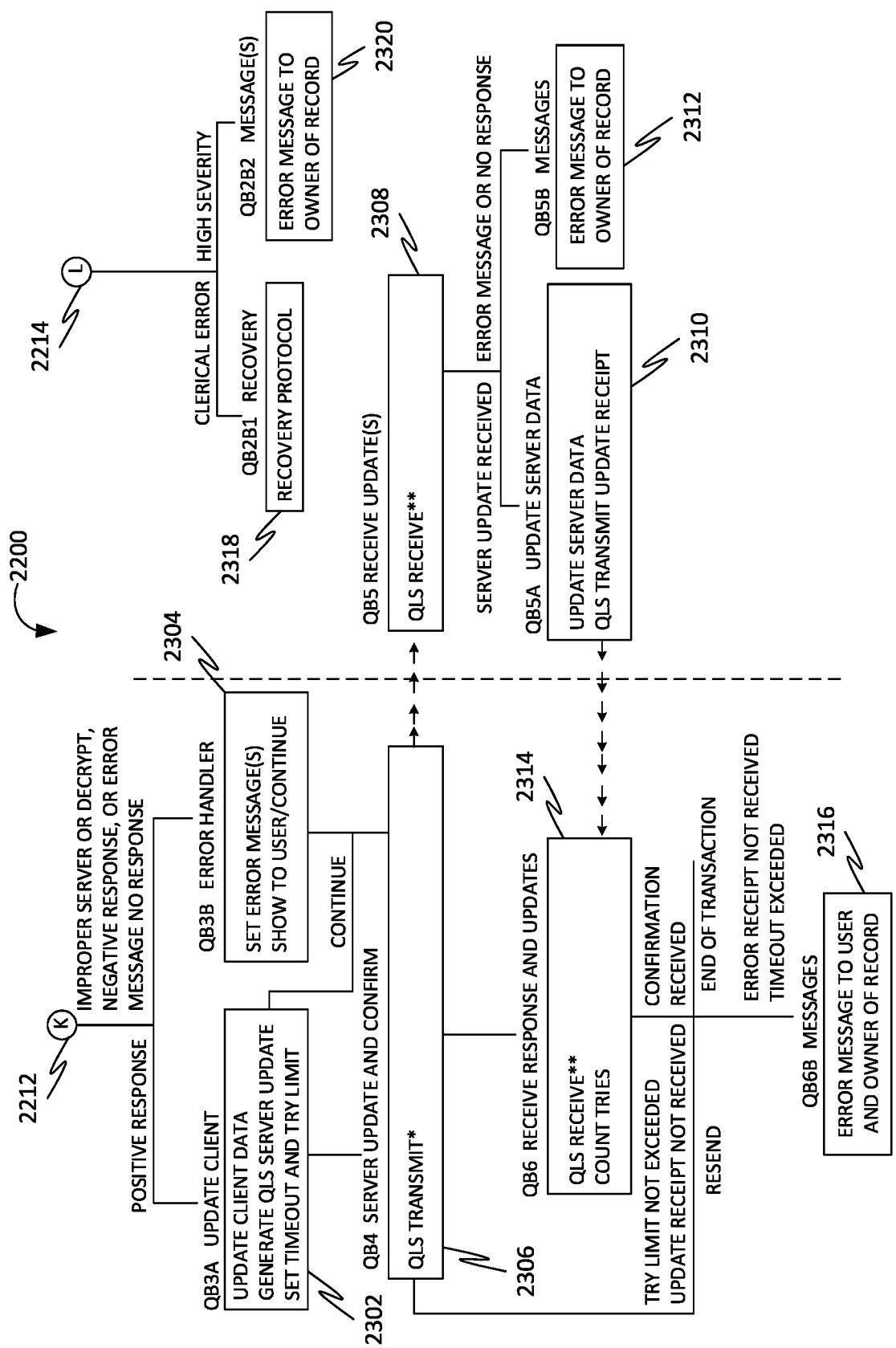
FIG. 23 is a second half of the flow diagram for Quantum Level Security QLS "basic" Packet data transfer, in accordance with some embodiments.

FIG. 23 is a second half of the flow diagram of the method 2200 for Quantum Level Security QLS "basic" Packet data transfer, in accordance with some embodiments.

If positive response is found, then at 2302, the method 2200 may include updating client data, generating QLS server update and setting timeout and trying limit.

If improper server or decrypt, negative response, or error message no response is found, then at 2304, the method 2200 may include setting error message(s) and showing to user/continue.

At 2306, the method 2200 may include transmitting QLS.

At 2308, the method 2200 may include receiving QLS.

If server update received is found, then at 2310, the method 2200 may include updating server data and transmitting QLS update receipt.

If error message or no response is found, then at 2312, the method 2200 may include sending error message to owner of record.

At 2314, the method 2200 may include receiving QLS and counting tries.

At 2316, the method 2200 may include sending error message to user and owner of record.

If clerical error is found, then at 2318, the method 2200 may include recovering protocol.

If high severity is found, then at 2320, the method 2200 may include sending error message to owner of record.

Figure 24:
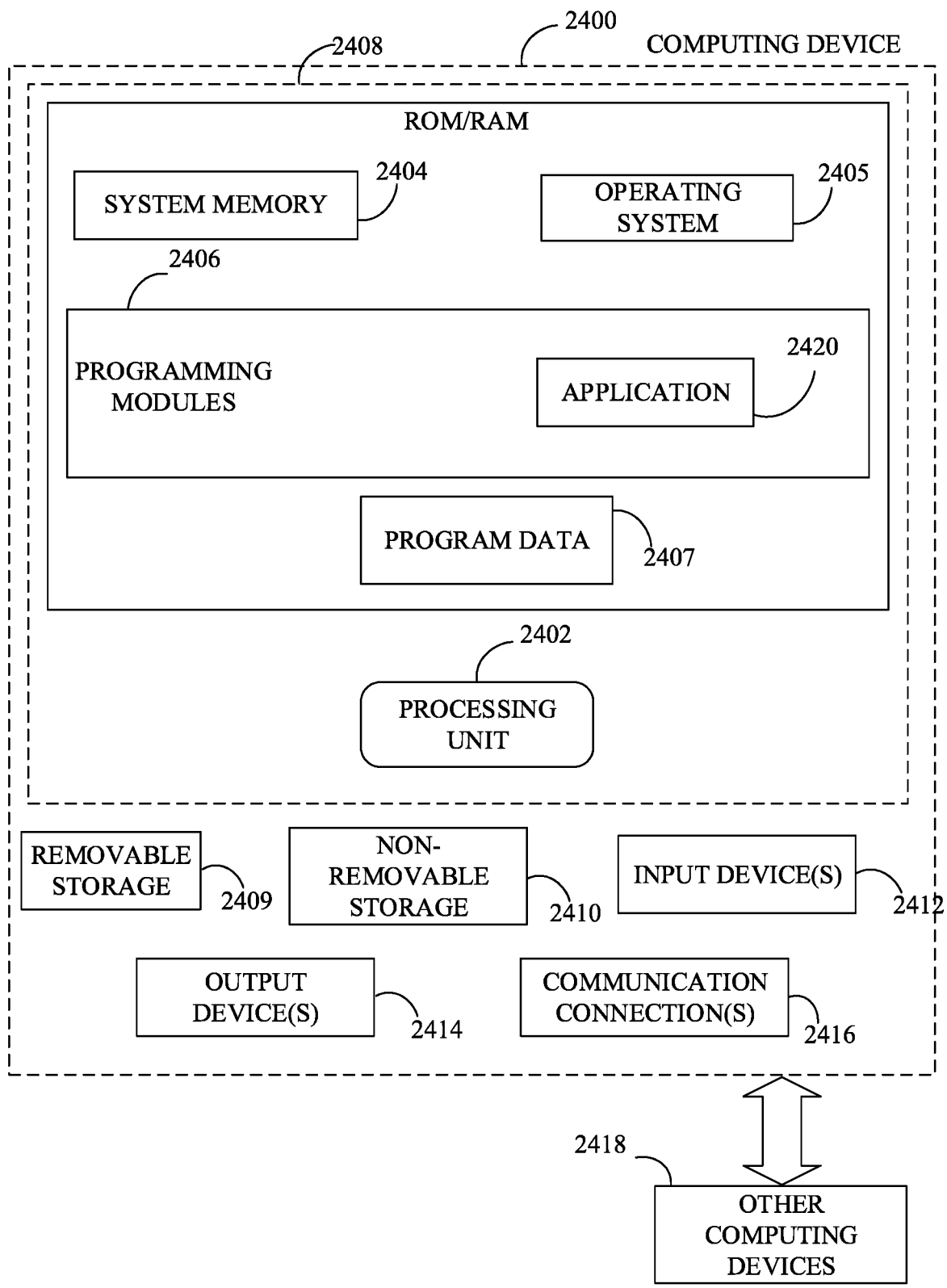
FIG. 24 is a block diagram of a computing device for implementing the methods disclosed herein, in accordance with some embodiments.

With reference to FIG. 24, a system consistent with an embodiment of the disclosure may include a computing device or cloud service, such as computing device 2400. In a basic configuration, computing device 2400 may include at least one processing unit 2402 and a system memory 2404. Depending on the configuration and type of computing device, system memory 2404 may comprise, but is not limited to, volatile (e.g. random-access memory (RAM)), non-volatile (e.g. read-only memory (ROM)), flash memory, or any combination. System memory 2404 may include operating system 2405, one or more programming modules 2406, and may include a program data 2407. Operating system 2405, for example, may be suitable for controlling computing device 2400's operation. In one embodiment, programming modules 2406 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 24 by those components within a dashed line 2408.

Computing device 2400 may have additional features or functionality. For example, the computing device 2400 may also include additional data storage devices (removable and/or non-removable) such as, for example, magnetic disks, optical disks, or tape. Such additional storage is illustrated in FIG. 24 by a removable storage 2409 and a non-removable storage 2410. Computer storage media may include volatile and non-volatile, removable and non-removable media implemented in any method or technology for storage of information, such as computer-readable instructions, data structures, program modules, or other data. System memory 2404, removable storage 2409, and non-removable storage 2410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2400. Any such computer storage media may be part of device 2400. Computing device 2400 may also have input device(s) 2412 such as a keyboard, a mouse, a pen, a sound input device, a touch input device, a location sensor, a camera, a biometric sensor, etc. Output device(s) 2414 such as a display, speakers, a printer, etc. may also be included. The aforementioned devices are examples and others may be used.

Computing device 2400 may also contain a communication connection 2416 that may allow device 2400 to communicate with other computing devices 2418, such as over a network in a distributed computing environment, for example, an intranet or the Internet. Communication connection 2416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 2404, including operating system 2405. While executing on processing unit 2402, programming modules 2406 (e.g., application 2420 such as a media player) may perform processes including, for example, one or more stages of methods, algorithms, systems, applications, servers, databases as described above. The aforementioned process is an example, and processing unit 2402 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method to facilitate establishing a connection between an access-seeking device and an access granting device, the method comprising:
   receiving, using a communication device, a Quantum Level Security (QLS) code from the access-seeking device, wherein the QLS code is generated by the access-seeking device based on at least one QLS function and at least one parameter;
   receiving, using the communication device, an independent QLS code generated by an access granting device based on the at least one QLS function and the at least one parameter;
   comparing, using a processing device, the QLS code and the independent QLS code;
   establishing, using the communication device, the connection between the access-seeking device and the access granting device based on a result of the comparing; and
   wherein the QLS code is not stored on a storage media.

2. The method of claim 1, wherein at least one of the at least one QLS function and the at least one parameter is configured to generate a new QLS code corresponding to each time a service is accessed by the access-seeking device.

3. The method of claim 2, wherein at least one of the at least one QLS function and the at least one parameter is configured to change unpredictably over time.

4. The method of claim 1, wherein each of the at least one QLS function and the at least one parameter is unique to a relationship between the access granting device and the access-seeking device.

5. The method of claim 1, wherein the establishing is performed based on the QLS code being identical to the independent QLS code.

6. The method of claim 1 further comprising performing, using the communication device, a data transfer between the access granting device and the access-seeking device based on the establishing.

7. The method of claim 6 further comprising encrypting, using the processing device, data associated with the data transfer based on the QLS code prior to performing the data transfer.

8. The method of claim 1, wherein the at least one QLS code comprises a plurality of QLS code and the at least one parameter comprises a plurality of parameters.

9. The method of claim 1 further comprising:
   detecting, using the processing device, an improper access attempt based on the comparing;
   generating, using the processing device, a notification based on the detecting; and
   transmitting, using the communication device, the notification to an authorized device associated with the at least one QLS function and the at least one QLS parameter, wherein the notification is not transmitted to the access-seeking device.

10. A system to facilitate establishing a connection between an access-seeking device and an access granting device, the system comprising:
    a communication device configured for:

receiving a Quantum Level Security (QLS) code from the access-seeking device, wherein the QLS code is generated by the access-seeking device based on at least one QLS function and at least one parameter;

receiving an independent QLS code generated by the access granting device based on the at least one QLS function and the at least one parameter; and establishing the connection between the access-seeking device and the access granting device based on a result of comparing;

a processing device configured for comparing the QLS code and the independent QLS code; and wherein the QLS code is not stored on a storage media.

11. The system of claim 10, wherein at least one of the at least one QLS function and the at least one parameter is configured to generate a new QLS code corresponding to each time a service is accessed by the access-seeking device.

12. The system of claim 11, wherein at least one of the at least one QLS function and the at least one parameter is configured to change unpredictably over time.

13. The system of claim 10, wherein each of the at least one QLS function and the at least one parameter is unique to a relationship between the access granting device and the access-seeking device.

14. The system of claim 10, wherein the establishing is performed based on the QLS code being identical to the independent QLS code.

15. The system of claim 10, wherein the communication device is further configured for performing a data transfer between the access granting device and the access-seeking device based on the establishing.

16. The system of claim 15, wherein the processing device is further configured for encrypting data associated with the data transfer based on the QLS code prior to performing the data transfer.

17. The system of claim 10, wherein the at least one QLS code comprises a plurality of QLS code and the at least one parameter comprises a plurality of parameters.

18. The system of claim 10, wherein the processing device is further configured for:

detecting an improper access attempt based on the comparing; and generating a notification based on the detecting, wherein the communication device is further configured for transmitting the notification to an authorized device associated with the at least one QLS function and the at least one QLS parameter, wherein the notification is not transmitted to the access-seeking device.

* * * * *